(12) United States Patent
Gai et al.

(10) Patent No.: US 12,530,178 B1
(45) Date of Patent: Jan. 20, 2026

(54) TILE ASSIGNMENT FOR MATRIX MULTIPLICATION PACKING

(71) Applicant: Amazon Technologies, Inc., Seattle, WA (US)

(72) Inventors: Jiading Gai, Seattle, WA (US); Tobias Joseph Kastulus Edler von Koch, Austin, TX (US); Robert Geva, Cupertino, CA (US); Paul Gilbert Meyer, Jericho, VT (US); Donald John Kretsch, Cupertino, CA (US); Ron Diamant, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 877 days.

(21) Appl. No.: 17/657,279

(22) Filed: Mar. 30, 2022

(51) Int. Cl.
*G06F 9/44* (2018.01)
*G06F 8/41* (2018.01)
*G06N 3/082* (2023.01)

(52) U.S. Cl.
CPC .............. *G06F 8/447* (2013.01); *G06F 8/451* (2013.01); *G06N 3/082* (2013.01); *G06F 8/433* (2013.01)

(58) Field of Classification Search
None
See application file for complete search history.

(56) References Cited

U.S. PATENT DOCUMENTS

| 11,782,706 | B1 | 10/2023 | Diamant et al. |
| 2015/0106596 | A1 | 4/2015 | Vorbach et al. |
| 2019/0278593 | A1 | 9/2019 | Elango et al. |
| 2019/0391796 | A1 | 12/2019 | Brady et al. |
| 2020/0409717 | A1 | 12/2020 | Huynh et al. |
| 2021/0312320 | A1 | 10/2021 | Shah et al. |
| 2022/0156322 | A1* | 5/2022 | Singh .................. G06F 16/9024 |
| 2022/0229641 | A1 | 7/2022 | Meister et al. |
| 2022/0309027 | A1 | 9/2022 | Nama et al. |
| 2022/0343145 | A1* | 10/2022 | Xue ........................ G06F 17/16 |
| 2022/0414455 | A1* | 12/2022 | Collins .................... G06N 3/08 |

OTHER PUBLICATIONS

Arslan, M. A., et al., "Code Generation for a SIMD Architecture with Custom Memory Organisation," *2016 Conference on Design and Architectures for Signal and Image Processing (DASIP)*, Oct. 2016, IEEE, 8 pages.

(Continued)

*Primary Examiner* — Insun Kang
(74) *Attorney, Agent, or Firm* — Weaver Austin Villeneuve & Sampson LLP

(57) ABSTRACT

A technique for arranging matrix multiplications for concurrent execution in an integrated circuit device may include obtaining a representation of a data dependency graph of a neural network model. The data dependency graph may include having an accumulation group (AG) pack of accumulation groups (AGs), in which each of the AGs has one or more matrix multipartition instructions. A representation of a memory location base partition constraint graph of the AG pack can be generated, and an AG row group constraint graph can be generated based on the memory location base partition constraint graph. The AGs of the AG pack can then be assigned to tiles in an integrated circuit device based on the AG row group constraint graph.

17 Claims, 20 Drawing Sheets

(56) References Cited

OTHER PUBLICATIONS

Chen, P., et al., "A Versatile Software Systolic Execution Model for GPU Memory-Bound Kernels," *SC19: International Conference for High Performance Computing, Networking, Storage and Analysis*, Nov. 2019, IEEE, 81 pages.

Lakhotia, K., et al., "ReCALL: Reordered Cache Aware Locality based Graph Processing," *2017 IEEE 24th International Conference on High Performance Computing (HiPC)*, Dec. 2017, pp. 273-282.

Rotem, N., et al., "Glow: Graph Lowering Compiler Techniques for Neural Networks," arXiv:1805.00907v3 [cs.PL], Apr. 3, 2019, pp. 1-12, URL: https://arxiv.org/abs/1805.00907v3.

U.S. Non-Final Office Action dated Jun. 3, 2025 in U.S. Appl. No. 17/657,276.

Vasilache, N., et al., "Composable and Modular Code Generation in MLIR: A Structured and Retargetable Approach to Tensor Compiler Construction," arXiv:2202.03293v1 [cs.PL], Feb. 7, 2022, pp. 1-43, URL: https://arxiv.org/abs/2202.03293v1.

D. Nuzman, I. Rosen, and A. Zaks, "Auto-Vectorization of Interleaved Data for SIMD", *ACM SIGPLAN Notices*, vol. 41, Issue 6, pp. 132-143, Jun. 2006.

G. Goff, K. Kennedy, and C.-W. Tseng, "Practical Dependence Testing". *ACM SIGPLAN Notices*, vol. 26, Issue 6, pp. 15-29, Jun. 1991.

J. Llosa, et al., "Swing Modulo Scheduling: A Lifetime-Sensitive Approach" in *Proceedings of the 1996 Conference on Parallel Architectures and Compilation Technique*, Boston, MA, USA, Oct. 1996.

R. Allen, K. Kennedy, "Automatic Translation of FORTRAN Programs to Vector Form", *ACM Transactions on Programming Languages and Systems*, vol. 9, Issue 4, pp. 491-542, Oct. 1987.

I. Rosen, D. Nuzman, and A. Zaks, "Loop-Aware SLP in GCC" in *Proceedings of the GCC Developers' Summit*, Ottawa, ON, Canada, pp. 131-142, Jul. 2007.

S. Larsen and S. Amarasinghe, "Exploiting Superword Level Parallelism with Multimedia Instruction Sets", *ACM SIGPLAN Notices*, vol. 35, Issue 5, pp. 145-156, May 2000.

T. Kohonen, "The self-organizing map" in *Proceedings of the IEEE*, vol. 78, Issue 9, pp. 1464-1480, Sep. 1990.

U.S. Appl. No. 17/657,276, Gai et al., filed on Mar. 30, 2022.

* cited by examiner

AG Pack:
1. mm0(A[32,64),C[ 0, 32))   - AG0
2. mm1(B[ 0, 32),C[32,64))   - AG1
3. mm2(D[ 0, 32),A[ 0, 32))  - AG2
FIG. 4
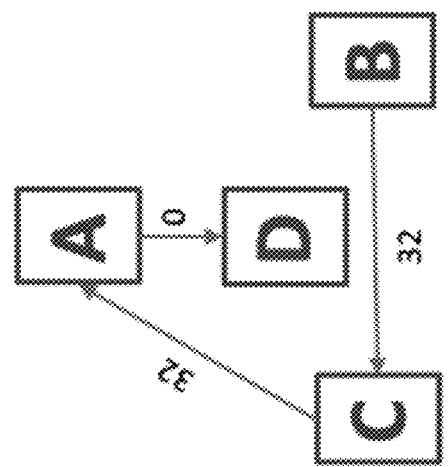
FIG. 5A
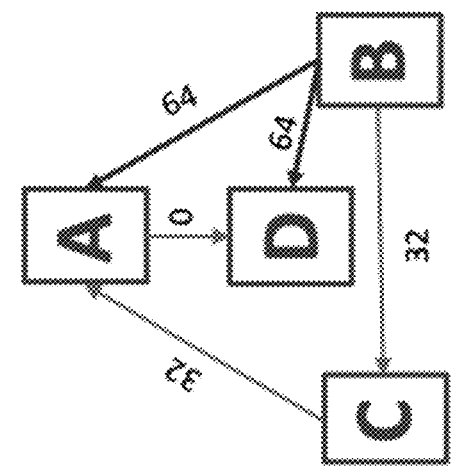
FIG. 5B
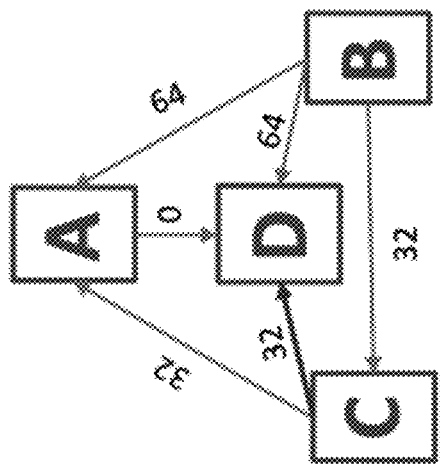
FIG. 5C AG Pack:
1. mm0(A[32,64),C[ 0, 32))   - AG0
2. mm1(B[ 0, 32),C[32,64))   - AG1
3. mm2(D[ 0, 32),A[ 0, 32))  - AG2

612

TILE ASSIGNMENT FOR MATRIX MULTIPLICATION PACKING

BACKGROUND

Neural networks utilize computational models to perform complex tasks such as image recognition, natural language processing, among others. A neural network can perform computations using a set of weights. Through these computations, the weights are combined with input data (which may also be referred to as feature maps) through multiple layers of a neural network model. The weights are typically combined with input data using matrix multiplication operations. Thus, improving execution of the matrix multiplication operations can improve the throughput of the neural network.

BRIEF DESCRIPTION OF THE DRAWINGS

Various embodiments in accordance with the present disclosure will be described with reference to the drawings, in which:

FIG. 4 illustrates an example of a code sequence of an accumulation group pack;

FIGS. 5A to 5C illustrate the progression of an example of generating a memory location base partition constraint graph;

DETAILED DESCRIPTION

A processing engine (PE) array (or a systolic array) is a hardware architecture designed to accelerate matrix multiplication (matmul) operations, such as those used in neural network computations. The PE array includes processing engines arranged in rows and columns. Each processing engine is capable of perform a multiply-and-accumulate operation. The PE array is operating at maximum throughput when each PE is performing a computation every clock cycle. This is typically achieved by performing matmul operations with tensor sizes that can fill the entire PE array. For a matmul operation involving smaller tensors that do not fill the entire PE array, sections of the PE array may remain idle until a new matmul operation is loaded onto the array. This can lead to a reduction in throughput and wasted compute cycles.

To improve the throughput in such situations, the PE array can be tiled to support performing multiple matmul operations concurrently in the array. However, typical workloads may not necessarily have consecutive matmul operations involving small tensors that neatly fit into the PE array. Instead, the matmul operations can be spread out across the instruction code. Hence, even when a PE array has native tiling support, rearrangement of the instruction code may be needed to sequentially pack the matmul operations into the PE array.

The techniques disclosed herein provide a compiler with a matmul packing capability that can be used to optimize the compiled code to take advantage of the tiling support of a PE array. The matmul packing technique can automatically find instruction level parallelism among matmul instructions in a neural network model, and combines them into vector operations for concurrent execution in the PE array. The matmul packing technique may operate on an intermediate representation (IR) of the neural network model, and pack the parallelizable matmul instructions together by reordering them so that they appear next to each other in the output IR. The matmul packing technique also assigns the matmul instructions to tiles on the PE array, and can annotate each packed matmul instruction with its tile position on the PE array. Conflicts between packed matmul instructions and non-packed matmul instructions can also be resolved to ensure the vectorized IR is schedulable and allocatable during the downstream compilation phases. In some implementations, the matmul packing optimization can be implemented in the backend stage of the compiler pipeline before the scheduler.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

Figure 1:
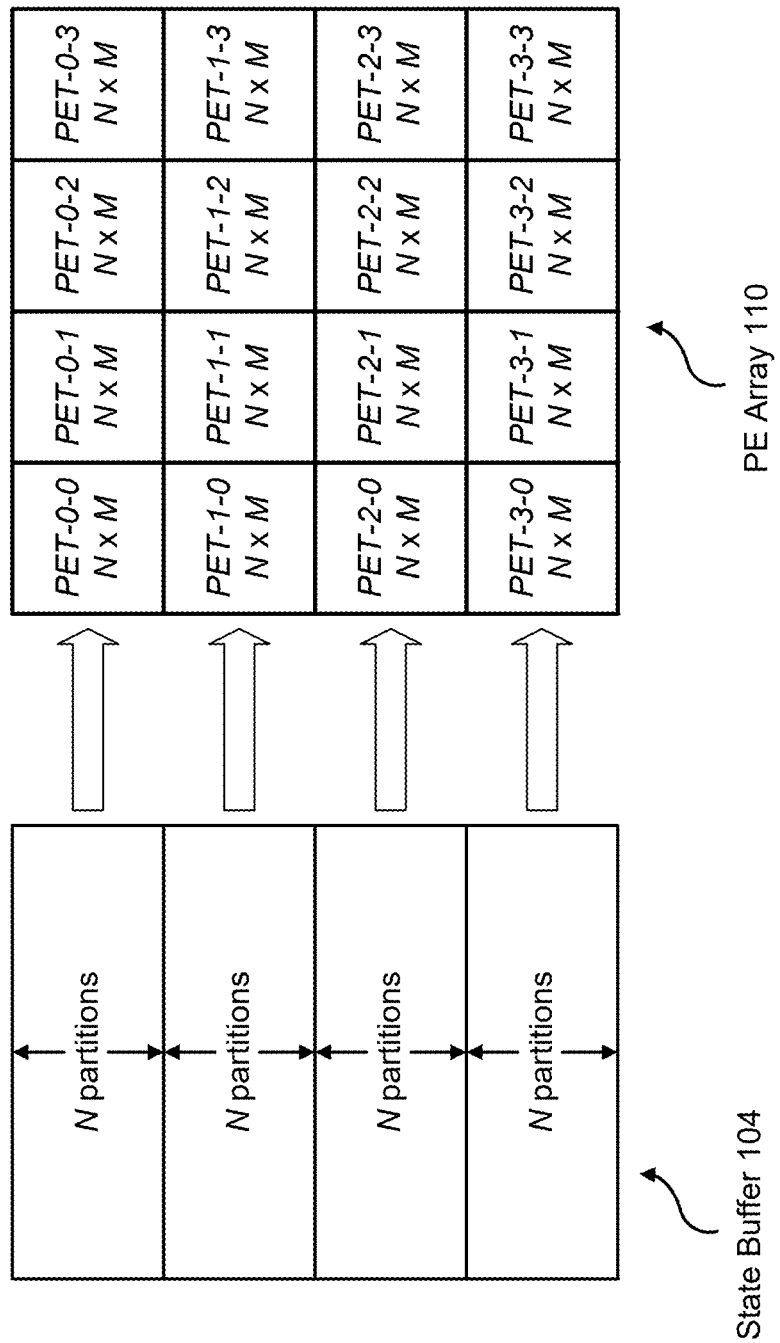
FIG. 1 illustrates a block diagram of an example of a processing engine array.

FIG. 1 illustrates an example of a PE array architecture having tiling support. PE array 110 may include 16 PE tiles (e.g., PET-0-0 to PET-3-3) arranged in 4 rows and 4 columns. Each PE tile may include N×M number of PEs. Each PE may include, for example, a multiplier-accumulator circuit (e.g., a multiplier and an adder). A PE can also be considered as an arithmetic logic unit (ALU). Hence, the dimensions of the PE array is 4N×4M. For example, in some implementations, each PE tile may include 32×32 PEs (N=M=32), and the PE array can be a 128×128 array. In FIG. 1, each PE tile is referenced by a row group and column group index. By way of example, PET-0-0 is the PE tile in the first row group and first column group, and PET-3-3 is the PE tile in the fourth row group and fourth column group. Each PE tile can perform its own matmul instruction. Multiple PETs can also be grouped together to perform a matmul instruction having larger tensors. For example, PE array 110 may support 32×32, 32×64, 32×128, 64×32, 64×64, 64×128, 128×32, 128×64, and 128×128 tiling options. Other implementations may support other sets of tiling combinations.

During operation, values such as feature map and/or weight values are shifted horizontally along the row direction into PE array 110 from a state buffer 104. The multiplication results are accumulated vertically and written into a partial sum (PSUM) buffer (not shown) along the column direction. State buffer 104 may include the same number of row partitions as the number of rows in PE array 110. Each row of state buffer 104 feeds into one row of the PE array 110. In the example shown, if the PE array 110 has 128 rows (N=32), then the state buffer 104 may include 4×N=128 number of row partitions. Because each row partition of state buffer 104 feeds into a corresponding row in PE array 110 (e.g., row partition 0 feeds into row 0 of PE array, row partition 1 feeds into row 1 of PE array, etc.), the tensors subject to a matmul instruction being performed in a PE tile are loaded from the same set of row partitions corresponding to that PE tile. Hence, data placement and tile positions are taken into account when packing matmul instructions into the PE array.

Generally, matmul instructions can be packed or tiled into a PE array if the matmul instructions are able to fit into the PE array according to the tiling configurations/combinations supported by the PE array, and the matmul instructions do not have a data dependency in which one matmul instruction uses the results of another matmul instruction. If the matmul instructions being tiled have the same or overlapping column groups in the PE array, the respective partial sums of the matmul instructions can be written to different PSUM banks. In some implementations, the matmul instructions being packed can have a minimum tensor size to hide the instruction fetch latency (e.g., 40 clock cycles). Furthermore, it can be beneficial for the matmul instructions being packed to have identical shapes for the weight tensors to avoid incurring extra cycles for shape reconfiguration.

The matmul packing technique disclosed herein is a loop-aware matmul vectorizer that can automatically determine whether a candidate pack of matmul instructions can be vectorized via a reordering transformation to place them next to each other. The matmul packing algorithm can include performing a dependency analysis on the input instructions, then forming a priority queue of candidate packing pairs and iteratively selecting the next best pair in a greedy fashion. The algorithm may also allocate the row group (row_grp) and column group (col_grp) fields for each matmul instruction in the selected packs. The instructions can then be reordered around the packed matmul instructions so that the packed matmul instructions are next to each other in the output program order, and the output program order is a valid schedule (stay topologically ordered).

To store the optional attributes representing each matmul instruction's row_grp and col_grp on the PE array, a "tile_position" field can be added to the backend matmul instruction. The optional tuple attribute can be in the form of: "tile_position=<row_grp, col_grp>". For example, the allowed values for row_grp and col_grp can each be 0, 32, 64, and 96 for a 128×128 PE array with 32×32 tiles. To represent the matmul packs, a "pack_id_hint" field can also be added to PSUM memory locations to indicate a pack identifier for the matmul instructions being packed together.

The matmul packing algorithm may operate on the basic blocks after all loops have been unrolled by the compiler. The packing algorithm is capable of packing at two granularity levels: at the matmul instruction level, or at the accumulation level (group of matmul instructions that accumulate to the same PSUM bank). Multiple matmul instructions may accumulate to the same PSUM bank, for example, when a large matrix is split up into smaller matrices to fit into the PE array. For ease of explanation, the matmul packing algorithm will be described as operating on accumulation groups (AGs). It should be understood that an AG may refer to a matmul instruction, or a group of matmul instructions that accumulate to the same PSUM bank.

Each AG can be initialized as an AG pack. In other words, an AG pack starts off as one AG. The matmul packing algorithm then combines AG packs to form larger AG packs by iteratively groups "similar" AG packs together until a fixed point. During the process of grouping parallelizable matmul instructions, a similarity metric is used to determine how similar two AG packs are. The similarity metrics may include a measurement of the relative position or proximity in the input program order of the IR, closeness in the innermost loop identifier, similarity in feature map (ifmap) tensor size, and similarity in the number of matrix multiplication operations (numMMs) in the AG pack.

Matmul Packing and Instruction Reordering

To facilitate the determination of which AG packs are suitable to combine, a data dependency graph (DDG) and its transitive closure (DDG-TC) can be generated. DDG can be used to reason about the dependence relations among matmul instructions and deciding whether a candidate pair can be packed together (e.g., if there is no dependence path between them). DDG can also be used to verify that the reordered operations remain a valid topological order (schedulable). Directly checking reachability on the DDG can be computationally and memory expensive (equivalent to single source shortest path traversal in a directed acyclic graph from every source matmul instruction). Hence, a transitive closure of the DDG (DDG-TC) can be used to determine reachability relations. The DDG_TC can be generated by iteratively traversing all the instructions on DDG in reverse topological order, and adding dependence edges between an instruction and its grandparent instructions on DDG until convergence. In some implementations, to further reduce the computation time, the transitive closure can be generated for up to a search window limit specified as a compiler option. This does not affect the correctness because the packing candidates are chosen according to a search window limit such that candidates beyond the search window is automatically precluded from consideration, as will be explained further below.

A pair of AG packs: <agpk$_0$, agpk$_1$> can be considered a valid candidate pair for packing based on a set of one or more criteria. These criteria for packing candidacy may include one or more of:

∀AGi ∈ agpk0, AGj ∈ agpk1: AGi and AGj are not reachable to each other on DDG;

agpk$_0$ and agpk$_1$ are able to fit on the PE array running together according to the tile arrangement supported by the PE array;

packing of agpk0 and agpk$_1$ does not render any other AGs un-allocatable (whether it be packed or non-packed);

agpk0 and agpk1 are large enough to hide the instruction fetch latency (e.g., 40 cycles); and agpk0 and agpk1 have identical shapes for their weight tensors to avoid shape reconfiguration in the PE array.

It should be noted that both agpk0 and agpk1 can be sets of AGs. Prior to entering the packing iterations, each AG initializes to its own AG pack. As the packing loop continues, the AG packs may grow larger in size, as chosen AG pack pairs are being packed together iteratively. In the candidate pairing step, the packing algorithm may find all feasible pairs of AG packs which can be combined to form larger AG packs, for example, according to the constraints above. Each packing candidate contains two AG packs. Pairwise grouping looks at whether each pair of AG packs satisfy the set of criteria. A valid candidate pair is pushed onto a heap sorted based on a set of similarity metrics (e.g., tuple of heuristics). These heuristics may include proximity in the input IR, similarity of the innermost loop IDs, similarity in feature map (ifmap) sizes, and/or similarity in the number of matmul instructions (numMMs).

The packing algorithm may assume that the instruction ordering in the input IR is already a high-quality ordering optimized for sequential execution. For example, the input IR to the packing algorithm may already have undergone various optimizations in prior compiling stages. Therefore, parallelizable AGs that are closer to each other can be prioritized for packing over far apart pairs. In some implementations, the proximity between a pair of AGs in the input IR can be measured as a Hausdorff distance. For example, given two AG packs X and Y: $X=\{x|x \in pk0\}$ and $Y=\{y|y \in pk1\}$, the Hausdorff distance between them can be expressed as: $dist(X,Y)=\max \{\max\|x^*(y)-y\|, \max \|y^*(x)-x\|\}$, where $y^*(x)=\arg \min\|x-y\|$. Using this metric, packing candidates with AG packs that are closer to each other in the input IR can be prioritized for packing.

Turning now to the innermost loop ID, since the packing algorithm operates at the basic block level (loop nests in the code have been unrolled), any parallelizable groups of matmul instructions in the straight-line code sequence can be considered, whether they were previously in a loop body or outside loops altogether. By including loop awareness to the similarity metric, the state buffer pressure can be reduced. Prioritizing to pack matmul instructions unrolled from the same loop minimizes the lifetime of the values in that loop in the state buffer. The packing algorithm may precompute a mapping from each instruction to its innermost loop ID; and at pack selection time, packing candidates with a lesser number of unique innermost loop IDs can be ranked higher in priority. Preferably, all the matmul instructions in a selected packing candidate can come from the same loop, in which case, the number of unique innermost loop IDs is 1.

To maximize latency hiding, it is also preferable that the AG packs being combined have a similar execution time. In other words, it is preferable that the matmul operations all start at the same time step, and finish at the same time step. The latency for a matmul instruction can be linearly proportional to its ifmap size in bytes. Since an AG is a set of matmul instructions, the AG's total latency is equal to the sum of the latency of each constituent matmul instruction. Therefore, ifmap size and numMMs in an AG can provide an indication of the latency hiding quality in an AG pack. Using ifmap size and numMMs in AG as its latency hiding heuristics, the packing algorithm can prioritize packing candidates with the most amount of latency hiding (most profitable).

In some implementations, the similarity metric used to select candidates for packing can be characterized as a prioritized list of attributes of the AG pack pair. For example, in order of high to low priority, the prioritized list of attributes to consider can be instruction proximity in the input IR, innermost loop ID, feature map tensor size, and number of matmul instructions. In other words, a packing candidate with AG packs having close instruction proximity is given the highest priority. For packing candidates with the same instruction proximity, similarity in the innermost loop ID can be considered next. For packing candidates with the same instruction proximity and same innermost loop ID, similarity in the feature map size can be considered next. Lastly, for packing candidates having the same instruction proximity, same innermost loop ID, and same feature map size, the number of matmul operations can be considered.

Figure 2A:
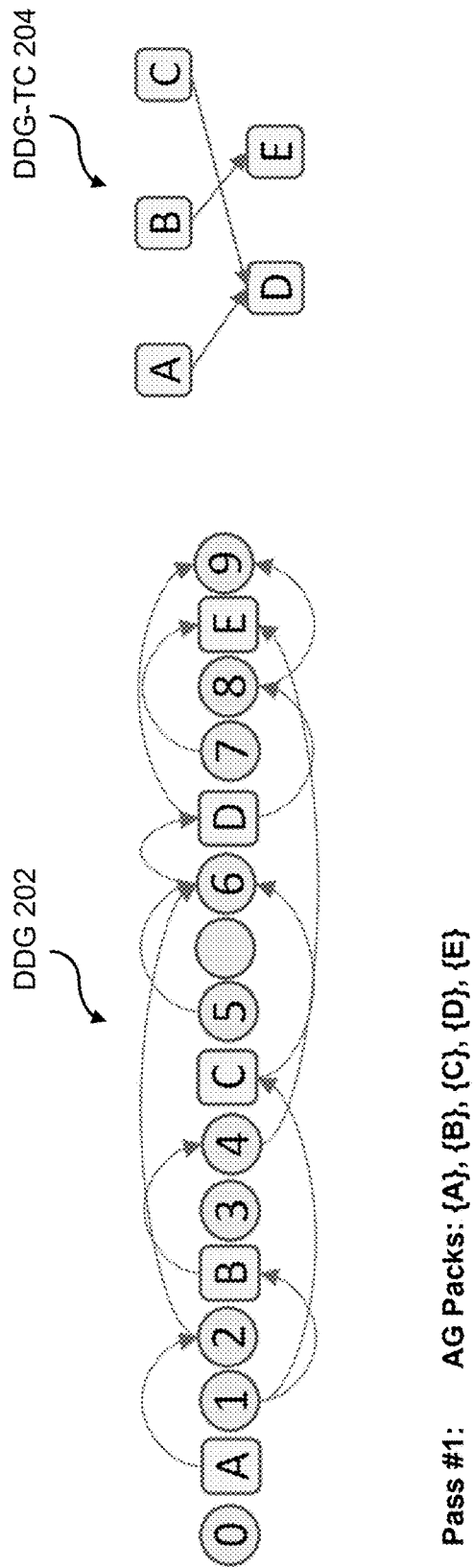
FIGS. 2A to 2G illustrate the progression of an example packing process.

FIGS. 2A-2G illustrates an example of an AG packing process. Referring to FIG. 2A, a DDG 202 can generated for an input IR to the packing algorithm. The input IR can be an IR that was generated from the source code of a neural network model in the frontend processing of the compiler, and may have undergone various optimizations steps in the middle-end processing of the compiler. At this stage of the compilation process, the loop nests in the code may have been unrolled, and thus the instructions in the IR have been flattened and can be represented as a straight-line sequence. Each node in DDG 202 may represent an operation in the sequence of execution, and edges connecting the nodes indicate a data dependence of a subsequent operation to an earlier operation. In DDG 202, matmul operations are depicted using square nodes and are denoted using alphabet letters. Other operations are depicted using circular nodes and are denoted using numbers, and no-ops are depicted as blank circular nodes. It should be noted a typical DDG can be much longer than the DDG 202 shown.

A transitive closure of the DDG (DDG-TC) 204 can be generated from DDG 202. DDG-TC 204 can be used to indicate the reachability of the matmul instructions. For example, DDG-TC 204 includes an edge between node A and node D, because node D is reachable from node A via node 2 and node 6, according to DDG 202. Similarly, DDG-TC 204 includes an edge between node C and node D, because node D is reachable from node C via node 6, according to DDG 202. DDG-TC 204 does not include an edge between node A and node B, because node B is not reachable from node A in DDG 202.

Next, AGs in DDG 202 are identified. As mentioned above, the matmul instructions in DDG 202 are depicted as square nodes with alphabet letters. Hence, the AGs in DDG 202 can be identified as nodes A, B, C, D, and E. A set of AG packs can then be initialized, with each AG pack being initialized with one of the AGs. The initial set of AG packs may include a first AG pack containing the AG represented by node A, a second AG pack containing the AG represented by node B, a third AG pack containing the AG represented by node C, a fourth AG pack containing the AG represented by node D, and a fifth AG pack containing the AG represented by node E.

The AG packs can then be combined to form larger AG packs by iteratively performing a set of packing operations. These packing operations include identifying AG pack pairs that are within a search window distance in DDG 202. The search window size can be set as a compiler option when invoking the compiler. In the example shown, the search window size can be set to 5. Hence, each pair combination of the initial 5 AG packs satisfies this search window, because they are all within the search window size of 5 AG packs.

Packing candidates can then be formed from these pairs of AG packs that are within the search window. AG packs that do not satisfy a set of packing criteria can be omitted from further consideration. The set of packing criteria may include one or more of the AG packs of the pair being unreachable to each other in the DDG (no data dependency), the AG packs of the pair being able to fit into a tile arrangement supported by the PE array, the AG packs involve a tensor size that is larger than an instruction fetch latency threshold, and/or the AG packs having an identical weight tensor shape. For example, the AG pack pair of {A,D} can be omitted from consideration because node D is reachable from node A. Similarly, the AG pack pairs of {B,E} and {C,D} can be omitted, as indicated by DDG-TC 204. For ease of explanation, the example shown in FIG. 2A assumes that the AG pack pairs of {A,B}, {A,C}, {B,C}, {B,D}, and {D,E} are the pairs satisfying the set of packing criteria, and that the other pairs within the search window fails one or more of the criteria. Hence, the set of packing candidates can be formed as {A,B}, {A,C}, {B,C}, {B,D}, and {D,E}.

A similarity metric is then applied to each packing candidate to determine the similarity between the AP packs of the packing candidate. The similarity metric may include a prioritized list of attributes of the AG packs of the packing candidate, and such attributes may include an instruction proximity measurement, number of innermost loop IDs, difference in ifmap sizes, and/or difference in number of matrix multiplications in the AG packs. The example shown in FIG. 2A assumes that all AGs have the same innermost loop IDs, and this the innermost loop ID metric has been omitted. The similarity metric for each packing candidate is expressed as the tuple <proximity, ifmap size, numMM> to indicate the instruction proximity measurement, the difference in ifmap sizes, and the different in the number of matrix multiplications. For each attribute, a smaller numeric value indicates a closer similarity.

By way of example, packing candidate {A,B} may have a similarity metric of <3,4,1>, because: (1) node B is three instructions from node A; (2) node B has an ifmap size that is 4 units greater than the ifmap size of A; and (3) node B has one more unit of matrix multiplications than node A. Taking packing candidate {B,D} as another example, {B,D} may have a similarity metric of <5,1,0> because: (1) node D is five instructions from node B (without counting AGs and no-ops); (2) node D has an ifmap size that is 1 unit greater than the ifmap size of B; and (3) node D has the same number of matrix multiplications as node B. The similarity metric for the other packing candidates can be derived in a similar manner. It should be noted that a value of 0 for ifmap size means that the two AG packs have the same ifmap size, and a value of 0 for numMM means that the two AG packs have the same number of matrix multiplications. For AG packs that include multiple AGs, the instruction proximity measurement can be determined as a Hausdorff distance.

The set of packing candidates can then be sorted according to their similarity metrics. As mentioned above, the instruction proximity measurement may take priority over the other attributes. As such, the packing candidates are first sorted according to their instruction proximity measurements. Packing candidates having the same instruction proximity measurements are then sorted according to the ifmap size difference. Packing candidates having the same instruction proximity measurements and ifmap size are then sorted according to the difference in number of matrix multiplications. The sorted list of packing candidates and their similarity metric are shown in the table in FIG. 2A.

Figure 2B:
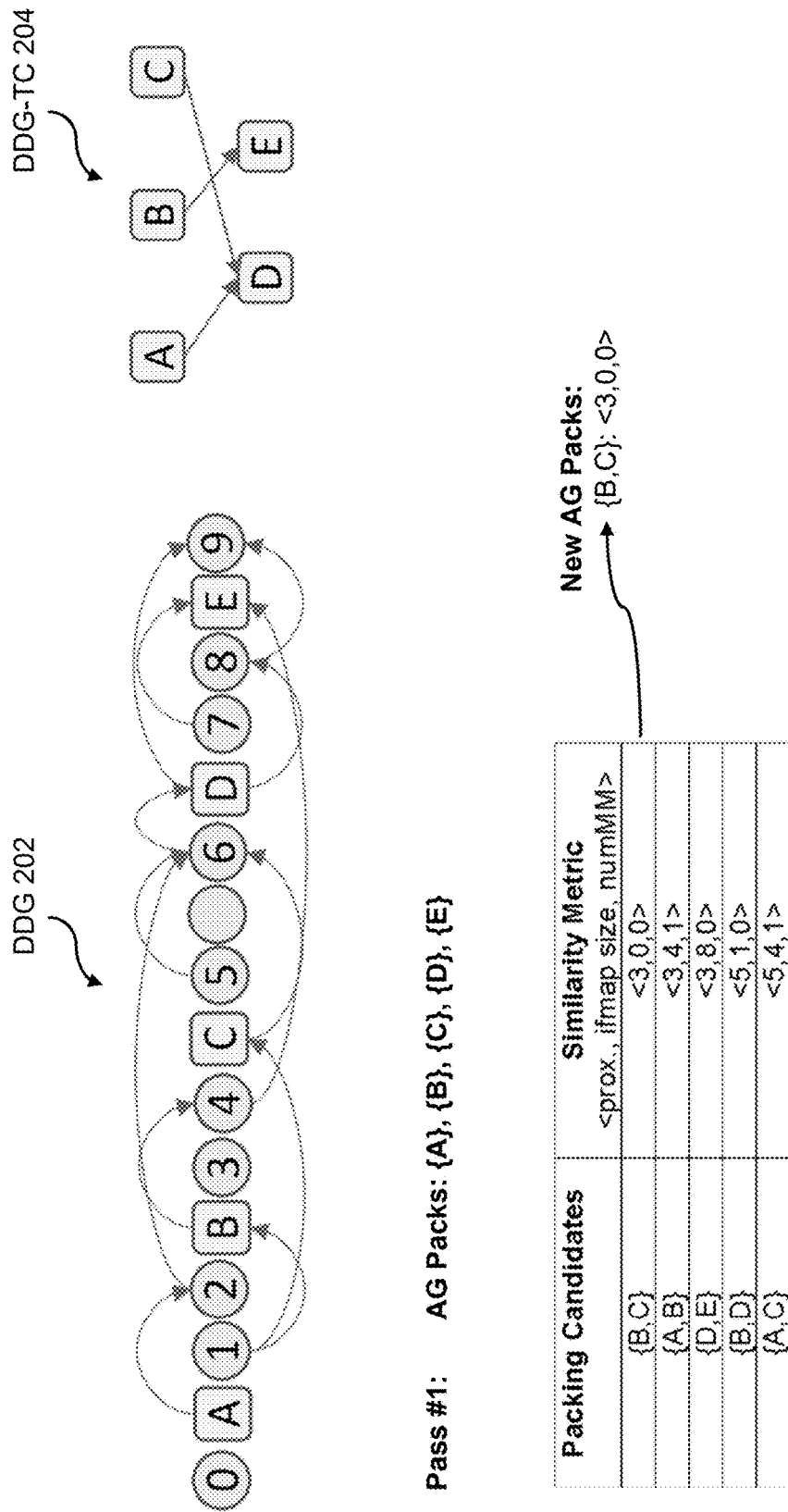
Figure 2C:
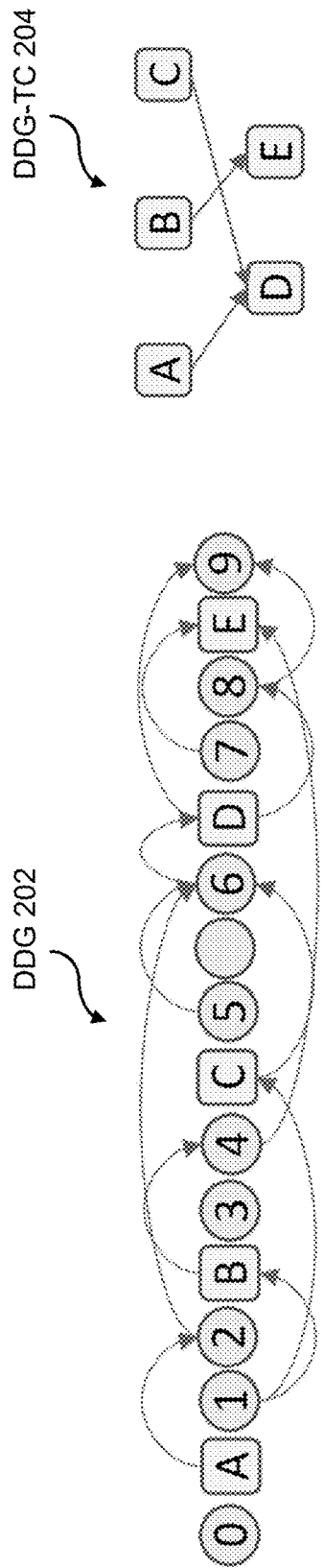

Referring now to FIG. 2B, the packing candidate having the AG pack pair that are most similar to each other is selected. In the example shown, the packing candidate whose members are most similar to each other is {B,C}. Hence, {B,C} is selected to form a new AG pack by grouping the AG pack {B} and the AG pack {C} together to form AG pack {B,C}. Upon selecting a packing candidate for packing, the packing candidates having at least one of the AG packs in the selected packing candidate can be pruned from the set of packing candidates. Referring to FIG. 2C, packing candidates {B,C}, {A,B}, {B,D}, and {A,C} can be pruned from the set of packing candidates, because each of these packing candidates have either the AG pack {B} or the AG pack {C}.

Figure 2D:
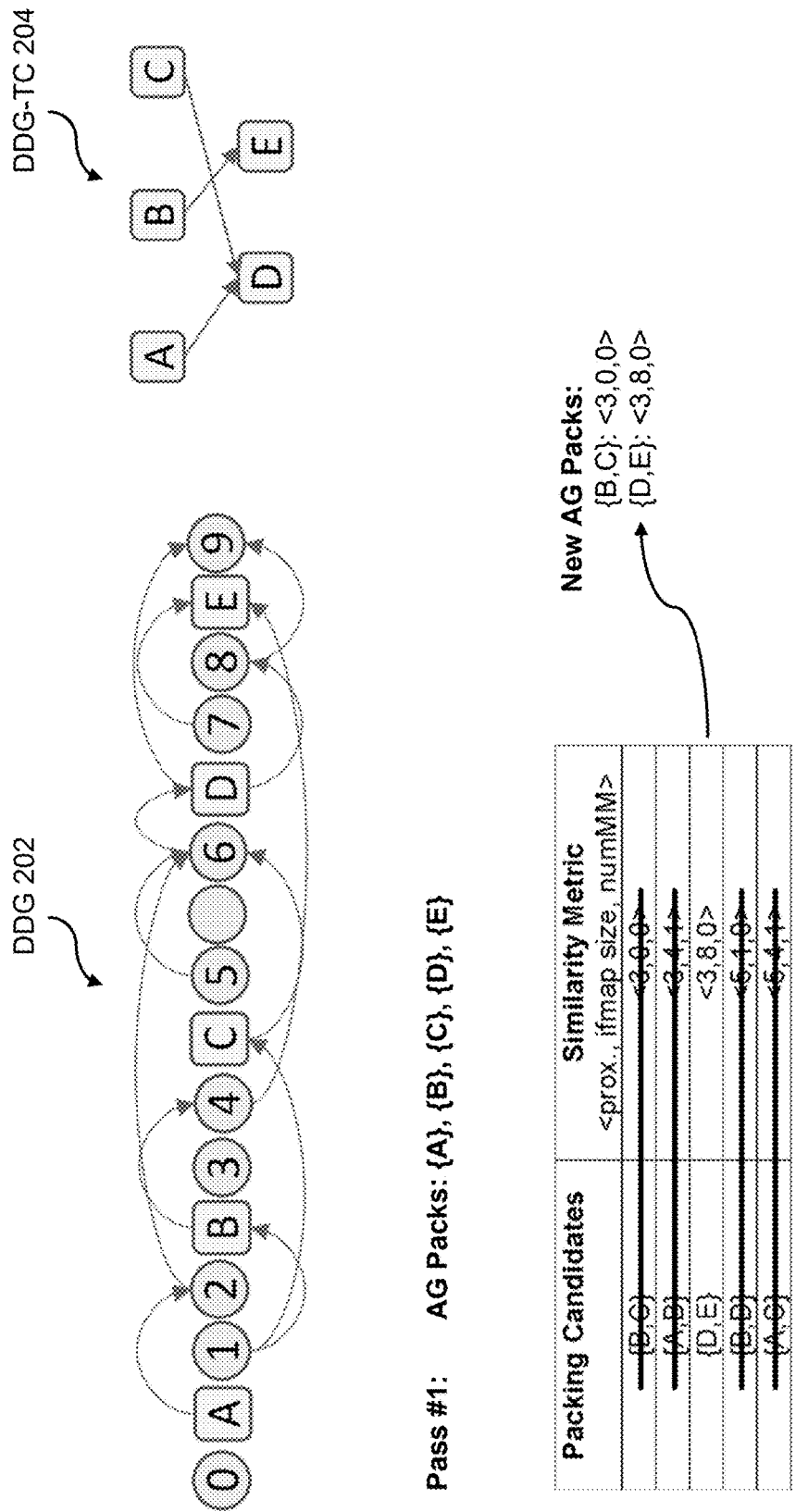
Figure 2E:
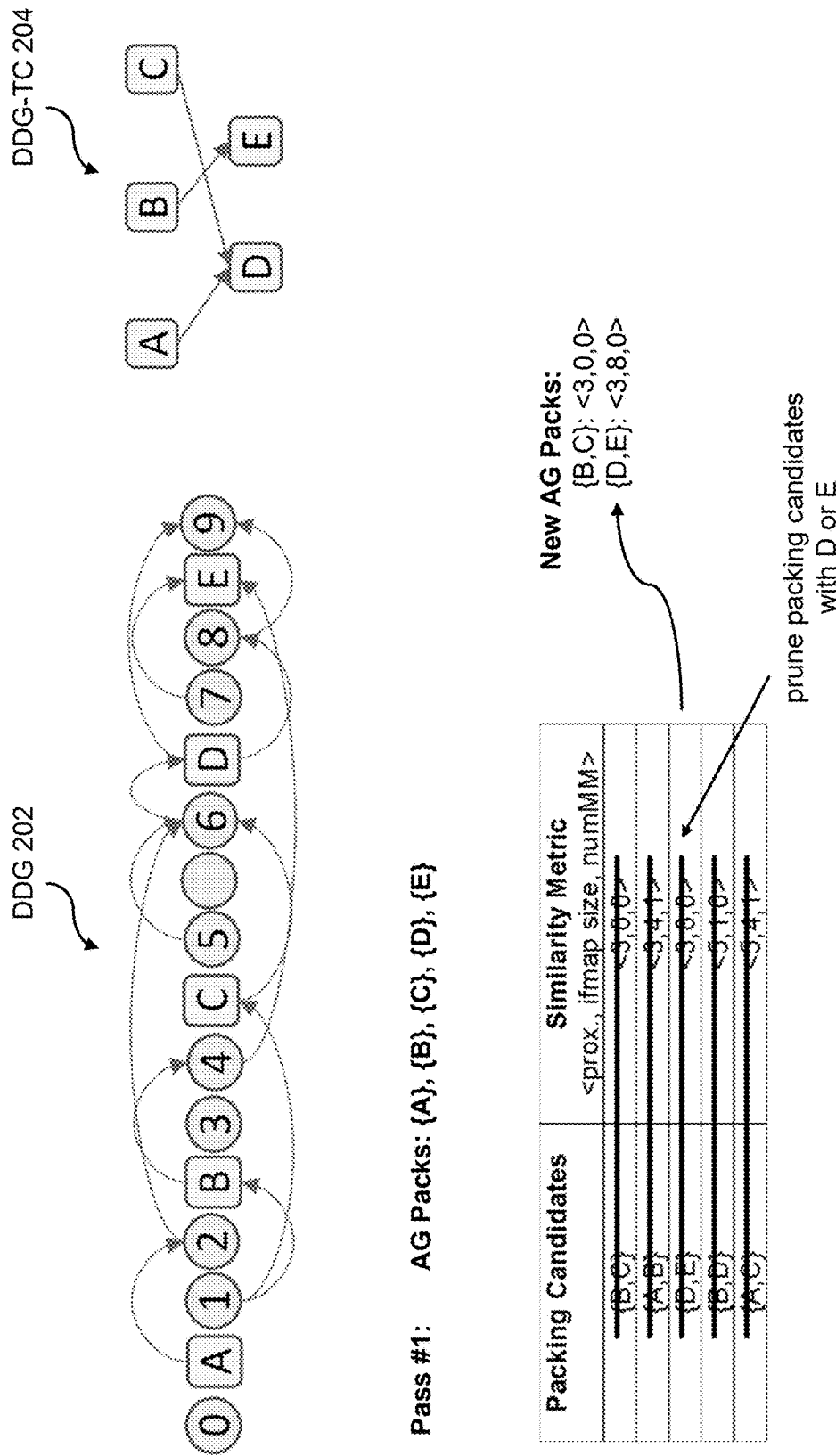
Figure 2F:
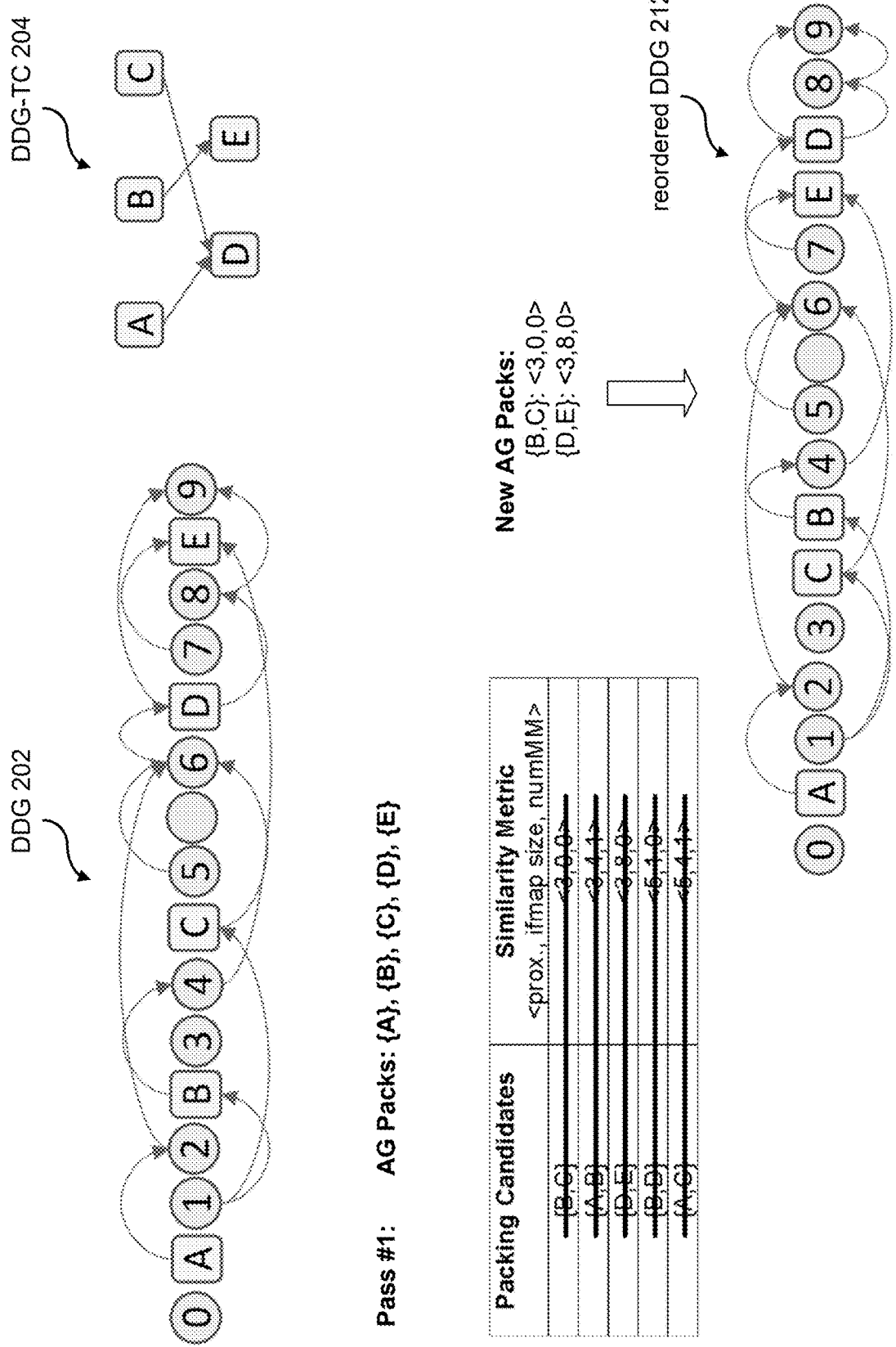

The next packing candidate having the AG pack pair that are most similar to each other is then selected. Referring to FIG. 2D, the packing candidate {D,E} is selected to form a new AG pack. Any remaining packing candidates having either the AG pack {D} or the AG pack {E} are pruned from the set of packing candidates. This process can be iteratively performed until all packing candidates are pruned from the set of packing candidates, which is shown in FIG. 2E. At this point, DDG 202 can be reordered to place the AGs in each new AG pack together. Referring to FIG. 2F, DDG 202 is rearranged to form reordered DDG 212 to place the AG pack {B} next to the AG pack {C} to form the new AG pack {B,C}, and to place the AG pack {D} next to the AG pack {E} to form the new AG pack {D,E}.

Figure 2G:
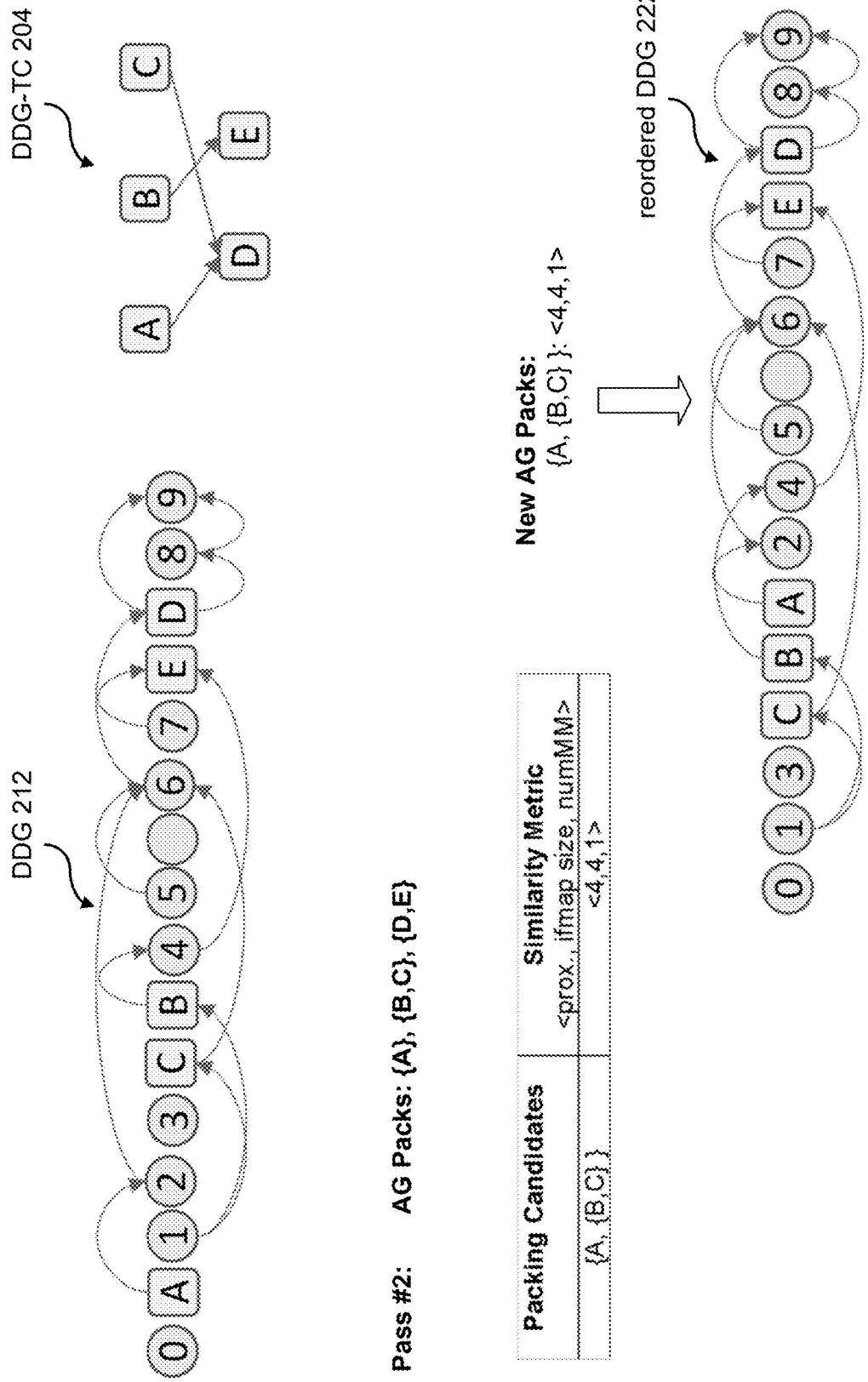

The aforementioned packing operations can be repeated to combine one or more new AG packs in the reordered DDG 212 based on the set of packing criteria and the similarity metric. Referring now to FIG. 2G showing a second pass of the packing process, the AG packs in the new DDG 212 includes three AG packs represented as {A}, {B,C}, and {D,E}. AG pack {B,C} and AG pack {D,E} are the newly formed AG packs. The AG pack pairs satisfying the set of packing criteria are identified. In the example shown, the AG pack pair of {A, {B,C}} forms a packing candidate. The AG pack pair of {A, {D,E}} is not a valid packing candidate because the AG pack {D,E} is reachable from the AG pack of node A. Since this is the only packing candidate, this packing candidate is selected to form a new AG pack by combining AG pack {A} with AG pack {B,C} to form new AG pack {A,B,C}. DDG 212 is then rearranged to place nodes A, B, and C next to each other as shown in FIG. 2G as reordered DDG 222. At this point, no addition packing can be performed, and the packing operations on the current search window is complete.

As described above, for each selected AG pack, the packing algorithm rearranges the pack's member matmul instructions so that they form a consecutive sequence without any other instructions in between in the transformed IR. However, in some scenarios, there can be other instructions in between a pair of matmul instructions in the input IR that form dependence relations with the pair. During the reordering process, the DDG is consulted to ensure the reordered IR remains a valid topological order (schedulable).

Tile Assignment

In addition to determining which AGs are packed together and selected for vectorization, the packing algorithm can also determine an optimal tile position on the PE array for each AG in the AG pack. The instruction sequence around the AG pack is reordered such that all the matmul instructions belong to an AG pack form a consecutive sequence of matmul instructions (back-to-back without any other instructions in between). At the end of the reordering, the packed AGs form a non-interleaving sequence of matmul instructions, which begins with all the matmul instructions from AG0, followed by all the matmul instructions from AG1, and so on, for all AGs of the AG pack. It should be noted that the scheduler of the compiler that subsequently schedules the matmul instructions may interleave the packed sequence to increase parallelism in the PE engine.

The tile position for a matmul instruction is a tuple of two integer numbers denoting the row group (row_grp) and column group (col_grp) to be issued on the PE array. For example, in a PE array of 4×4 tiles with each tile being a 32×32 array, the row_grp and col_grp fields can be identified using the set of integers {0, 32, 64, 96}. Since the PE array loads its input data from the state buffer, and each state buffer partition feeds horizontally into the same row of the PE array, the row_grp placement of the tensors of the matmul instruction has a direct impact on the state buffer memory pressure. An optimal tile position for a matmul instruction is one that can minimize the state buffer pressure. This can be achieved, for example, by positioning the matmul instructions in a pack as evenly and as far apart as possible over the PE array row dimension.

To facilitate the tile assignment, a memory location base partition constraint graph (mlBPCG) and an AG row group constraint graph (agRGCG) can be generated. The mlBPCG can be used by the packing algorithm to ensure that the tile position fields calculated for a pack of AGs do not render the output IR un-allocatable during the downstream allocation phase (e.g., violate hardware restrictions on the access pattern). The mlBPCG for memory locations is a weighted, bi-directional directed graph of the memory locations of all the tensors in the input IR. The mlBPCG contains an edge between memory location ML0 and memory location ML1 if the base partitions (starting row) of ML0 and ML1 are constrained to a fixed difference.

Figure 3:
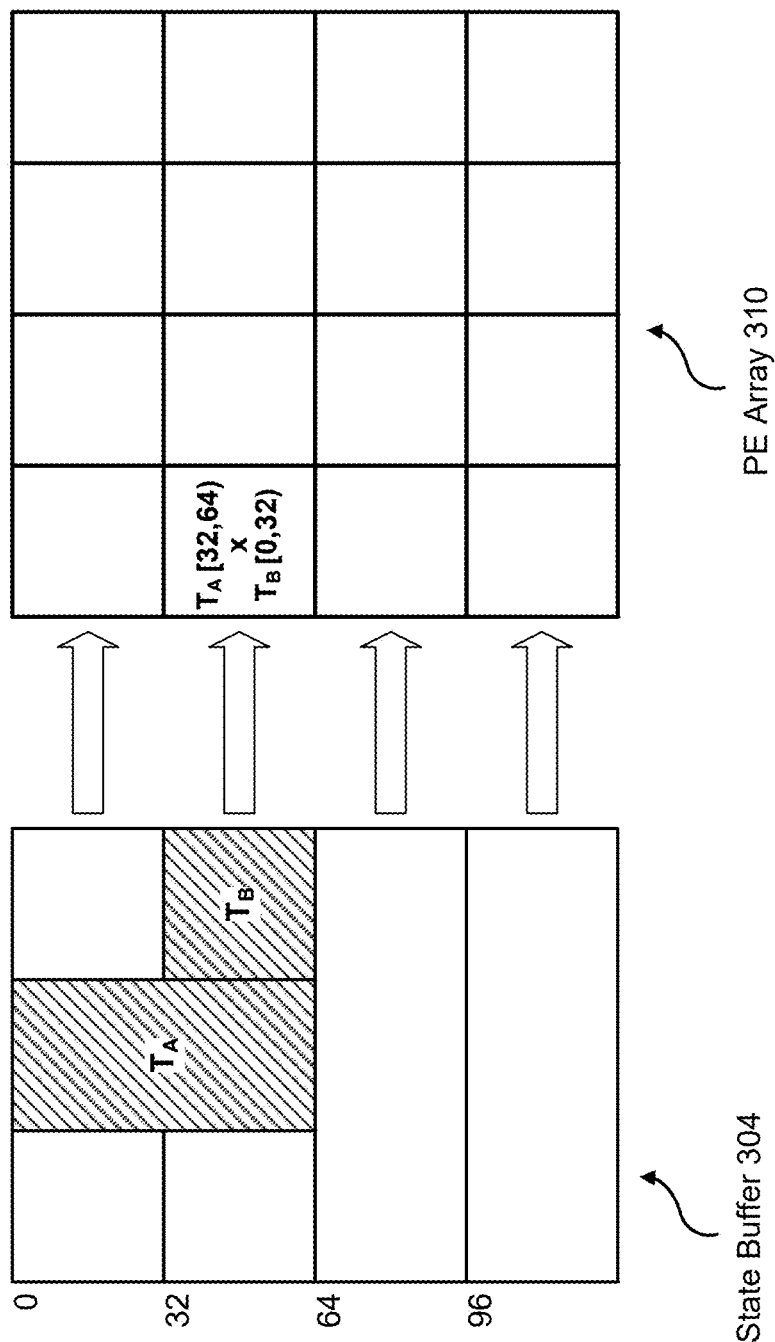
FIG. 3 illustrates an example of base partition constraint for a matrix multiplication operation.

FIG. 3 illustrates an example of tensors of a matmul instruction having a base partition constraint. In the example shown, PE array 310 is a 128×128 array, tensor $T_A$ is a 64×32 matrix, and tensor $T_B$ is a 32×32 matrix. A matmul instruction may involve multiplying the upper rows of $T_A$ with $T_B$ denoted as $T_A$ [32,64)×$T_B$ [0,32). The indices inside the brackets indicate the range of the rows of the tensor involved in the matmul instruction, a square bracket indicates the range is inclusive of the row index next to the square bracket, and a round bracket indicates the range is exclusive of the row index next to the round bracket. Hence, $T_A$ [32,64)×$T_B$ [0,32) indicates that rows 32 to 63 of $T_A$ is being multiplied with rows 0 to 31 of $T_B$. As shown in FIG. 3, if $T_A$ is placed in a memory location of state buffer 304 starting at row partition 0, then $T_B$ is constrained to start at row partition 32 in state buffer 304 because of the matmul instruction. In other words, $T_A$ and $T_B$ has a base partition constraint of 32 such that the matmul instruction can be performed in the PE array 310. The matmul instruction can be performed, for example, in a PE tile spanning rows 32 to 63 of PE array 310.

The agRGCG is another weighted, directed graph defined over AGs in the input IR. Similar to mlBPCG, it's also a bi-directional directed graph constructed among all the AGs in an AG pack. An edge represents a fixed difference in the row groups between AG0 and AG1, and no edge means there is no constraint between the two AGs. The edge weight is the constrained difference between the AG pair's row groups. Each edge also has a reverse edge representing the same constraint in the opposite direction (for simplifying bidirectional querying at packing stage).

The mlBPCG and agRGCG are closely related mathematically. The tile position field of a matmul instruction can specify the partition where operation will begin accessing its input tensors. The placement of the input tensors is constrained by the tile_position field and the access patterns. An access pattern for a tensor specifies, beside the number of partitions accessed, the base partition for an access. Hence, computing tile_position-base_partition yields the tensor's starting partition.

FIG. 4 illustrates an example of a code sequence of an AG pack, and FIGS. 5A-C illustrate an example construction of the mlBPCG for the matmul instructions of the code sequence of FIG. 4. Referring to FIG. 4, each AG in this example contains a single matmul instruction for ease of explanation. A, B and C represent the input 2D tensors for the matmul instructions in the code. Each input tensor can be thought of as a 2D rectangle with a height and a width: A, B, C are 64 partitions in height, and D is 32 partitions in height. Using a similar bracket notation as above, A [32, 64) denotes the higher 32 partition portion of A spanning row 32 to row 63. Therefore, in instruction mm0 (A [32,64), C [0, 32)), matmul mm0 consumes the higher 32 rows of A as its first operand and the lower 32 rows of C as its second operand. Given that each state buffer partition feeds horizontally into the same PE row, the higher 32 rows of A are aligned with the lower 32 rows of C to the same state buffer partitions. Accordingly, the difference between the base partitions (starting rows) of A and C are constrained to a fixed difference of 32 to allow matmul mm0 to be performed in the PE array. As a result, an edge is added in the mlBPCG from C to A with a weight of 32 to indicate the base partition constraint between C and A. The tensors of each matmul instruction are processed similarly. Hence, an edge is added in the mlBPCG from B to C with a weight of 32 (both are consumed by mm1), and another edge is added in the mlBPCG from A to D with a weight of 0 (both consumed by mm2). FIG. 5A illustrates the state of the mlBPCG after adding the three seeding edges.

Next, transitive edges are added to the mlBPCG: For example, since A and B are both constrained with C, A and B themselves are also constrained to a fixed difference in their base partitions via C transitively. As such, an edge is added from B to A with a weight of 64. In general, for any given pair of vertices i and j in the mlBPCG, if there exists a path from vertex i to vertex j, a direct edge is added to the mlBPCG from i to j with a weight equal to the total weight along the reachable path. Referring back to the B→A edge, A is reachable from B along the path B→C with a weight of 32, and the path C→A with a weight of 32. Thus, the edge from B to A has a weight of 64. FIG. 5B illustrates the state of the mlBPCG after adding the transitive edges that starts from B (e.g., B→A, and B→D). FIG. 5C illustrates the state of the mlBPCG after adding the transitive edges that starts from C (e.g., C→D). At this point, no further transitive edge can be added, and the mlBPCG is complete for the AG pack code sequence of FIG. 4. It should be noted that each edge also has a corresponding edge in the reverse direction with a negative weight to represent the constraint in the reverse direction.

Figure 6:
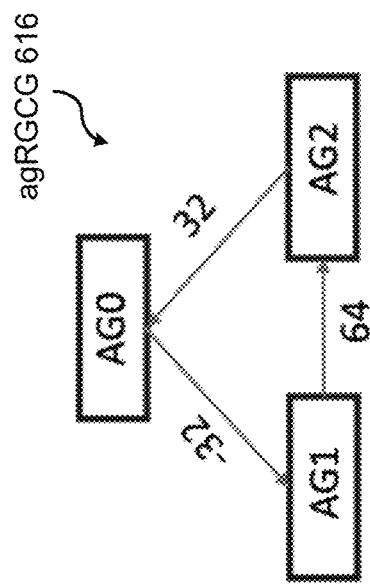
FIG. 6 illustrates an example of an accumulation group row group constraint graph generated from a memory location base partition constraint graph.
Figure 6:
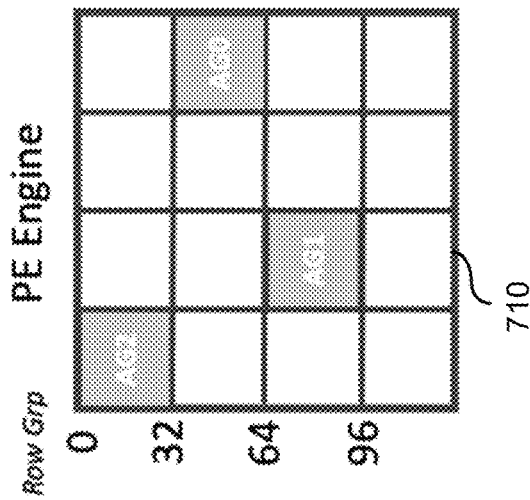
Figure 6:
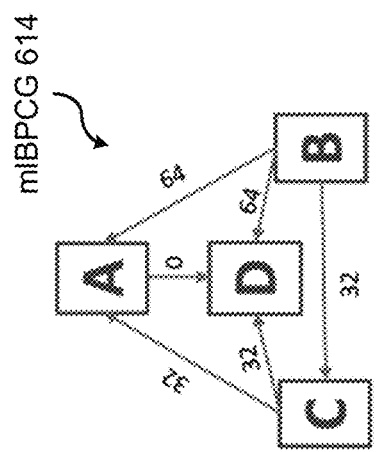

Once the mlBPCG has been generated, the agRGCG can be generated as follows. For each pair of AGs in which there exists an edge in the mlBPCG from any pair of the input tensors consumed by the two AGs, an edge is added between those two AGs in the agRGCG, with a weight being the row group difference constraint among them induced from the mlBPCG. FIG. 6 illustrates the construction of the agRGCG 616 using the mlBPCG 614 of FIG. 5C based on the code sequence 612 of FIG. 4. To calculate the edge weight between AG1 and AG2, both their feature map tensors and weight tensors can be considered, with the edge weight calculated from the feature map tensors being equal to the edge weight from weight tensors. A mismatch may indicate a consistency error in the input IR.

Referring to FIG. 6, the feature map tensor pair between AG1 and AG2 is <B, D>. The weight of edge B→D in the mlBPCG is 64. AG1 consume B starting at partition 0 (B [0,32)), and AG2 consumes D also starting from partition 0 (D [0, 32)). Hence, the starting partition difference or the starting row offset between the feature map tensors of AG1 and AG2 is 0. The edge weight between AG1 and AG2 in the agRGCG can be calculated by summing the edge weight from the mlBPCG (which is 64) and the starting row offset (which is 0). Accordingly, the edge weight between AG1 and AG2 in the agRGCG calculated using their feature map tensor pair is 64.

As for the weight tensor, the weight tensor pair between AG1 and AG2 is <C, A>, and the weight of edge C→A in the mlBPCG is 32. AG1 consumes C starting at partition 32 (C [32, 64)], and AG2 consumes A starting at partition 0 (A [0,32)]. This yields a starting partition difference or starting row offset of 32. Hence, the edge weight between AG1 and AG2 in the agRGCG is calculated using their weight tensor is 64, which is the sum of the edge weight from the mlBPCG (32) and the starting row offset (32). It should be noted that the edge weight calculated from the feature map tensor is consistent with the edge weight calculated from the weight tensor.

Similarly, the feature map tensor pair between AG0 and AG1 is <A, B>. The weight of edge A→B in the mlBPCG is −64 (negative because of the reverse direction). AG0 consumes A starting at partition 32 (A [32,64)), and AG1 consumes B starting from partition 0 (B [0, 32)). Hence, the starting partition difference or the starting row offset between the feature map tensors of AG0 and AG1 is 32. The edge weight between AG0 and AG1 in the agRGCG can be calculated by summing the edge weight from the mlBPCG (which is −64) and the starting row offset (which is 32). Accordingly, the edge weight between AG0 and AG1 in the agRGCG calculated using their feature map tensor pair is −32. The same edge weight can be calculated using the weight tensors of AG0 and AG1. A similar computation can be performed for AG2 and AG0 to yield an edge weight of 32 in the agRGCG. More generally, an edge weight in the agRGCG can be computed as the sum of the weight of the edge between the tensors of the AGs in the mlBPCG and the starting row offset of the tensors being accessed by the AGs.

Figure 7:
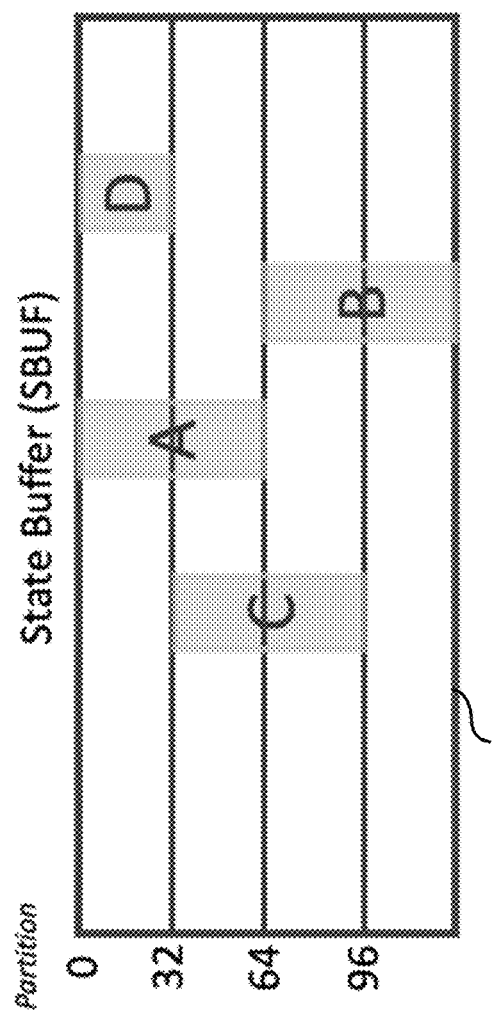
FIG. 7 illustrates an example of tensor placement and tile assignment.

With mlBPCG and agRGCG computed, the feasible placements of both input tensors in the state buffer, and AGs on PE array can be determined in constant time. FIG. 7 illustrates a feasible placement of input tensors A, B, C and D in the state buffer 704, and the corresponding feasible row group assignments for AG0, AG1 and AG2 in the PE array 710. It should be noted that the column groups assigned to AG0, AG1 and AG2 are chosen arbitrarily in FIG. 7 and need not be constrained as shown. The layout for tensors A, B, C and D are placed in state buffer 604 such that each AG can access both its tensors with each state buffer partition feeding horizontally into the same PE row (i.e., partition 0 of state buffer 604 feed into row 0 of PE array 610).

In some implementations, the tile position allocation task can be formulated as a constrained nonlinear optimization problem. The objective function represents the vertical spread of the matmul instructions in the pack along the rows of the PE array, subject to the hardware architecture and resource constraints. Given a selected AG pack {$AG_i | i \in \{0, 1, \ldots, N\}$}, the area of occupancy on the PE array for $AG_i$ can be denoted by its height $h_i$ and width $w_i$. The optimization problem is to search for the optimal tile positions (represented by $r_i$ and $c_i$) for each $AG_i$ that satisfies:

$$\min_{r_i, c_i} \sqrt{\frac{\sum_{I=1}^{R}[g(I) - \mu]^2}{R-1}}$$

such that:

(1) $r_i + h_i \leq r_j$ or $r_j + h_j \leq r_i$, $\forall i \neq j$, $[c_i, c_i + w_i) \cap [c_j, c_j + w_j) \neq \emptyset$ (2) $c_i + w_i \leq c_j$ or $c_j + w_j \leq c_i$, $\forall i \neq j$, $[r_i, r_i + h_i) \cap [r_j, r_j + h_j) \neq \emptyset$ (3) $r_i \geq 0$ and $r_i + h_i \leq R \cdot \rho$ (4) $c_i \geq 0$ and $c_i + c_i \leq C \cdot \gamma$ (5) $r_i - r_j = agRGCG[AG_i, AG_j]$, $\forall i \neq j$ and $agRGCG[AG_i, AG_j] \neq \emptyset$ (6) $\wedge_{x=1}^{\Omega} \wedge_{k=1}^{C} ConM(x, J_k) \& f(r_i, c_i, h_i, w_i, I_0, J_k) = 1$, $\forall I_0 \in \{0 \ldots R-1\}$ (7) $\wedge_{x=1}^{\Omega} \wedge_{k=1}^{R} ConM(x, I_k) \& f(r_i, c_i, h_i, w_i, I_k, J_0) = 1$, $\forall J_0 \in \{0 \ldots C-1\}$ (8) $r_i$ and $c_i \in \{0, 32, 64, 96\}$ where:

$$f(r_i, c_i, h_i, w_i, I, J) = \begin{cases} 1 & PE\_Tile(I, j) \in Area(r_i, c_i, h_i, w_i), \\ 0 & \text{otherwise} \end{cases}$$

$$g(I) = \sum_{I=1}^{N} \sum_{J=1}^{C} f(r_i, c_i, h_i, w_i, I, J)$$

$$\mu = \sum_{I=1}^{R} g(I)$$

In the above notations, R and C denote the number of PE tiles (e.g., R and C are both 4 for a PE array with 4×4 tiles), $\rho$ and $\gamma$ are the dimensions of each PE tile (e.g., $\rho$ and $\gamma$ are both equal to 32 for a 32×32 tile). I and J represent the coordinates for a PE tile (zero-indexed, e.g., PE_Tile (I=3, J=1) refers to the PE tile on the fourth row and second column of the PE array). The agRGCG is the adjacency representation of the weighted agRGCG graph described above. The function $f(r_i, c_i, h_i, w_i, I, J)$ is an indicator function which equals one if the area of PE occupancy determined by the tuple ($r_i, c_i, h_i, w_i$) covers PE_Tile (I,J) or else zero; g(I) computes the number of matmul instructions allocated to each PE row group I; and $\mu$ is the average number of matmul instructions over the PE row groups. The objective function above defines the standard deviation of the number of matmul instructions allocated in each row_grp. By minimizing the objective function, an optimally even spread of the matmul instructions in an AG pack over the row axis can be achieved.

The constraints (1) to (4) ensure that all the AGs in the pack are packed within the boundaries of the enclosing PE array and without overlapping. Constraint (5) checks if each assigned row group $r_i$ satisfies the row group constraint in agRGCG. Constraints (6) and (7) provides that the final tile position for a matmul instruction complies with the hardware requirements for the legal combinations of PE tiles. ConM denotes the constraint matrix of the supported tile arrangement of the PE array, where each row represents a legal combination and there are $\Omega$ rows. Symbols $\wedge$ and & represent the "logical and" matrix multiply between ConM and f.

In some implementations, the search space for tile position is relatively small (e.g., a PE array may have 4×4 tiles). As such, an optimal backtracking algorithm with eager pruning can be used to determine the tile position. The search algorithm uses backtrack to enumerate all possible solutions, and prunes infeasible branches on the search tree along the way. All things being equal, the branch that most equalize the instantaneous PE row occupancy will be favored.

A solution is built up by searching through the space of partial tile position allocations, if during the backtracking process of building up a solution, a constraint is falsified, the search tree is backtracked, and all possible ways of extending the current partial allocation are pruned. This eager pruning can significantly reduce the overall computation by up to a factor of four. The following heuristics can be used to trim down the search space efficiently: (1) check the architecture and pairwise constraints first; (2) allocate AGs in descending order of PE area occupied; and (3) pre-cluster the AGs in the pack into common subgroups, and allocate each subgroup atomically in descending order of group size. A pair of AGs belongs to the same common subgroup if they transitively share either the ifmap or weight tensors, or both.

Larger common subgroups tend to have less degree of freedom and are more challenging, therefore allocating larger common subgroups first is prone to trigger pruning early. Along the way of backtracking, we an auxiliary histogram can be used to track the number of AG's currently assigned to each PE row in the partial solution, which can be referred to as the Instantaneous PE Row Occupancy (IPRO). Each time the backtracking algorithm goes down the search tree one depth further to allocate a new AG, the PE row group that has the smallest IPRO is prioritized for assignment. To check for overlapping constraints between allocated AGs, a 2D boolean bitmap the size of the PE array dimensions can be used, with occupied tiles being set to TRUE. When placing a new AG, the tile bit can be checked if it is set on the boolean bitmap. Once an AG is placed, all the PE tiles it touches are set to TRUE. This allows testing a tile position for an AG in constraint time proportional to the PE array dimensions.

Figure 8:
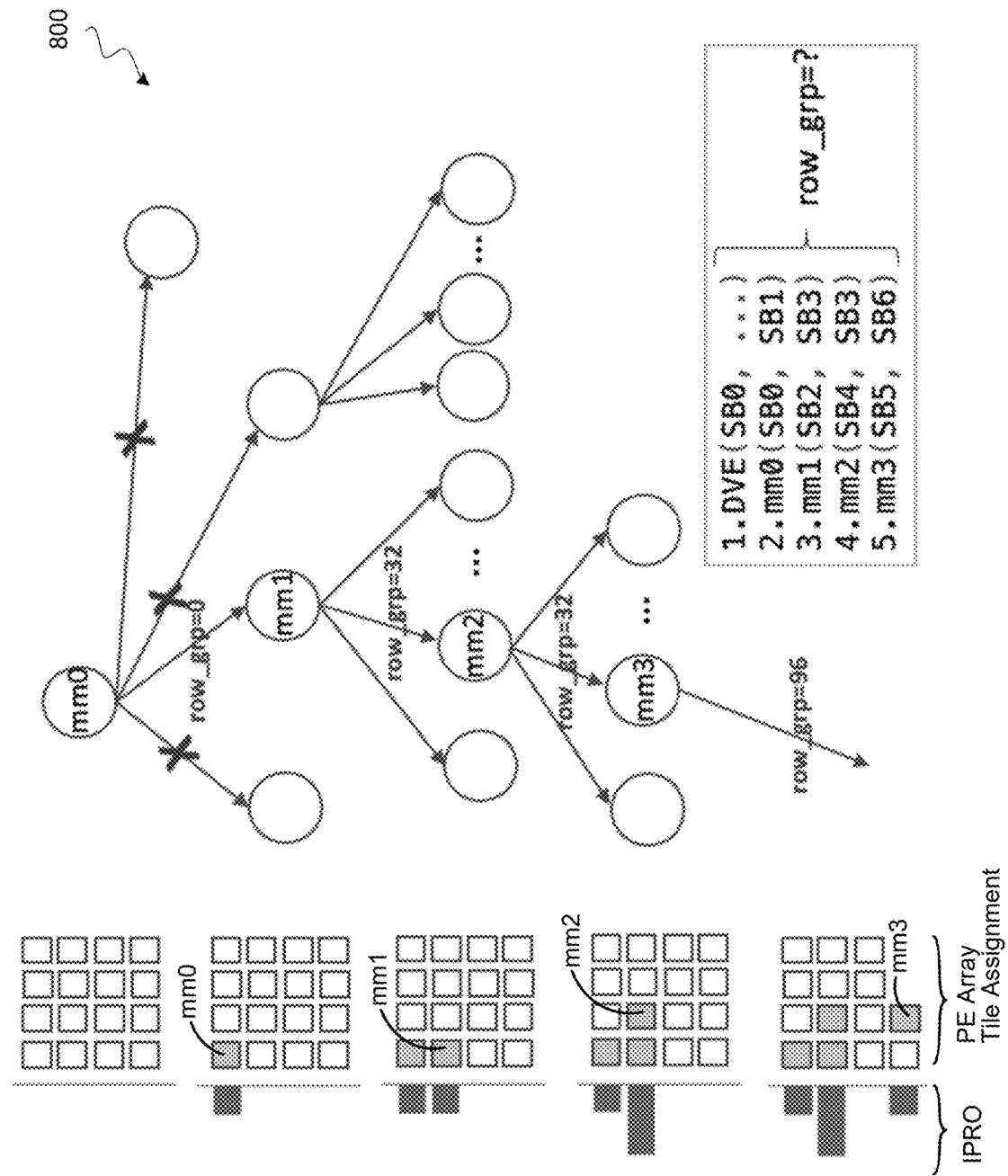
FIG. 8 illustrates an example of tile assignment using a search tree.

FIG. 8 illustrates an example of the backtracking algorithm traversing a search tree 800. In this example, there are four AGs in the selected pack, and the PE array has 4×4 tiles with each tile being a 32×32 array. For ease of explanation, each AG is assumed to have a single matmul instruction, and the height of each tile is represented as a row group. Hence, the PE array has four row groups designated by the starting row of 0, 32, 64, and 96.

To provide a starting point for illustrative purpose, a "DVE" instruction is added at the beginning of the code sequence. The DVE instruction is a vector engine instruction that may only read data starting from partition 0 of the state buffer. Hence, the presence of the DVE instruction forces the tensor SB0 to be placed starting at partition 0 of the state buffer. The first matmul instruction mm0 operates on SB0 as well. Hence, mm0 can only be placed on row group 0. The sidebar shows the IPRO histogram representing the state buffer pressure. At the first branching point, the constraint above requires mm0 to be assigned to row group 0. This allows three of the four total branches to be pruned early on, reducing the search space by a factor of four. The second and third matmul instructions mm1 and mm2 share the weight tensor SB3, and thus are clustered to the same common subgroup (to be allocated together in lock step). Subsequently, mm1 and mm2 can be allocated to row groups 32, 64, or 96, because the IPRO of these row groups is minimal (at zero). In this example, mm1 and mm2 is allocated to row group 32. Lastly, mm3 is assigned at the final branching point, and can be allocated to row groups 64 or 96, because the IPRO of these row groups is minimal (at zero). In this example, mm3 is allocated to row group 96.

When all feasible packing has been performed, the matmul instructions in the input IR are all partitioned into two categories: packed (vector) or unpacked (scalar). The packed matmul instructions may start from non-zero row groups allocated previously in the optimal tile position allocation, while the unpacked matmul instructions default to starting from row group 0. This situation can be a source of inconsistency in the allocated tile positions. For example, an unpacked matmul instruction may share a tensor with a packed matmul instruction that has been placed in a row group other than row group 0.

To handle such situations, a tensor-driven tile position constraint propagation algorithm can be used. At the seeding step, each tensor used by a packed matmul instruction can set its base state buffer partition according to matmul instruction's tile position. The seeding information is propagated across a work list consisting of all the unpacked matmul instructions iteratively until convergence. The algorithm maintains a mapping between each used tensor and its base partition. At each iteration, the tile positions of the unpacked matmul instructions can be adjusted if it is necessary to maintain consistency with the previously assigned tile position of the shared tensor.

Figure 9A:
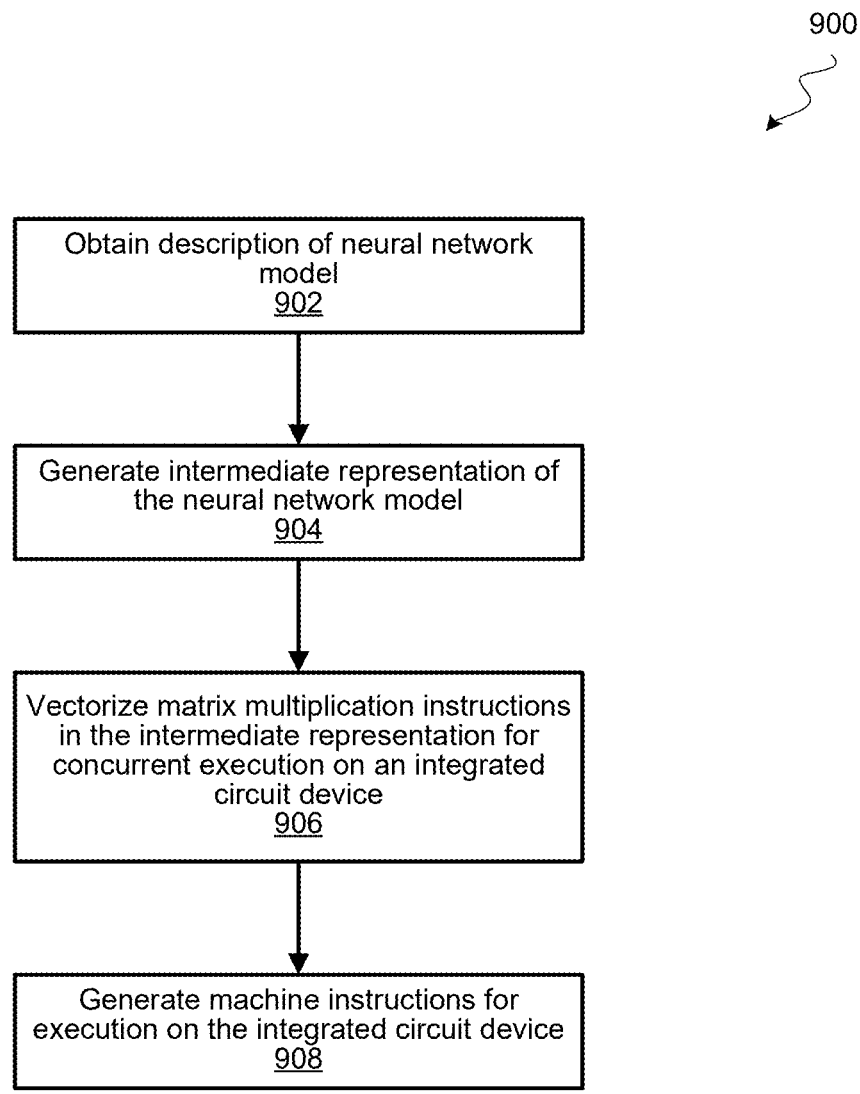
FIG. 9A illustrates a flow diagram of an example of a process for compiling a neural network model.

FIG. 9A illustrates a flow diagram of an example of a process 900 for compiling a neural network model. Process 900 can be performed, for example, by a compiler that interprets programming code describing the neural network model, and translates the programming code into machine instructions for execution on hardware (e.g., an integrated circuit device such as an acceleration engine). In some implementations, process 900 can be implemented on a computer-readable medium that is executable by one or more processors of a computing system to compile the programming code of a neural network model for loading onto the integrated circuit device for execution.

Process 900 may begin by obtaining a description of a neural network model at block 902. The description of the neural network model can be, for example, source code written in a high-level programming language, such as Python, Java, C++, among other examples. In some implementations, the description of the neural network model may utilize software libraries tailored for neural networks such as TensorFlow, PyTorch, etc. In some implementations, the description of the neural network model can be obtained from the local storage of the computing system executing the compiler, or from a remote storage over a network interface. A file name or a reference to the description of the neural network model can be provided with a command to invoke the compiler, or can be loaded into the compiler via a user interface.

At block 904, an intermediate representation (IR) of the neural network model is generated. The IR of the neural network model can be code and/or data structures used internally by the compiler to represent operations and dependencies between the operations. The IR provides an abstraction of the neural network model for the compiler to analyze and optimize the source code. For example, the IR of the neural network model may include code representing operators and edges representing dependencies between the operators. In some implementations, various optimizations can be performed on the IR. Such optimizations may include target independent optimizations such as algebraic simplifications, as well as target specific optimizations as operator fusion to fuse multiple operators into an execution kernel supported by the hardware.

At block 906, matmul instructions in the IR are vectorized for concurrent execution on an integrated circuited device. For example, the integrated circuit device may include a processing engine (PE) array that can accommodate a certain tensor size for performing a matrix multiplication. To avoid certain sections of the PE array from remaining idle when performing matrix multiplication of tensors having a smaller size than that of the PE array, multiple matrix multiplications can be performed concurrently in parallel in the PE array. For instance, one quadrant of the PE array can be performing a multiplication of tensor A with tensor B, while another quadrant of the PE array can be performing an independent multiplication of tensor C with tensor D. Process 900 can select matmul instructions that are suitable for concurrent execution, and vectorize the matmul instructions by grouping them together such that they can be executed in parallel. Grouping the matmul instructions together may involve rearranging those instructions in the IR such that they are in consecutive order.

At block 908, machine instructions for execution on the integrated circuit device are generated based on the vectorized matmul instructions. For example, the machine instructions corresponding to the vectorized matmul instructions in the optimized and reordered IR can be scheduled by a scheduler, and register and memory allocation can be performed on the data consumed by the instructions. Memory allocation for a state buffer that loads data into the PE array can be performed based on the tile assignment from block 908. Code generation then converts the optimized and reordered IR into machine code executable by the PE array. The generated machine instructions can be in the form of compiled code in a binary format that can be loaded onto the PE array for execution.

Figure 9B:
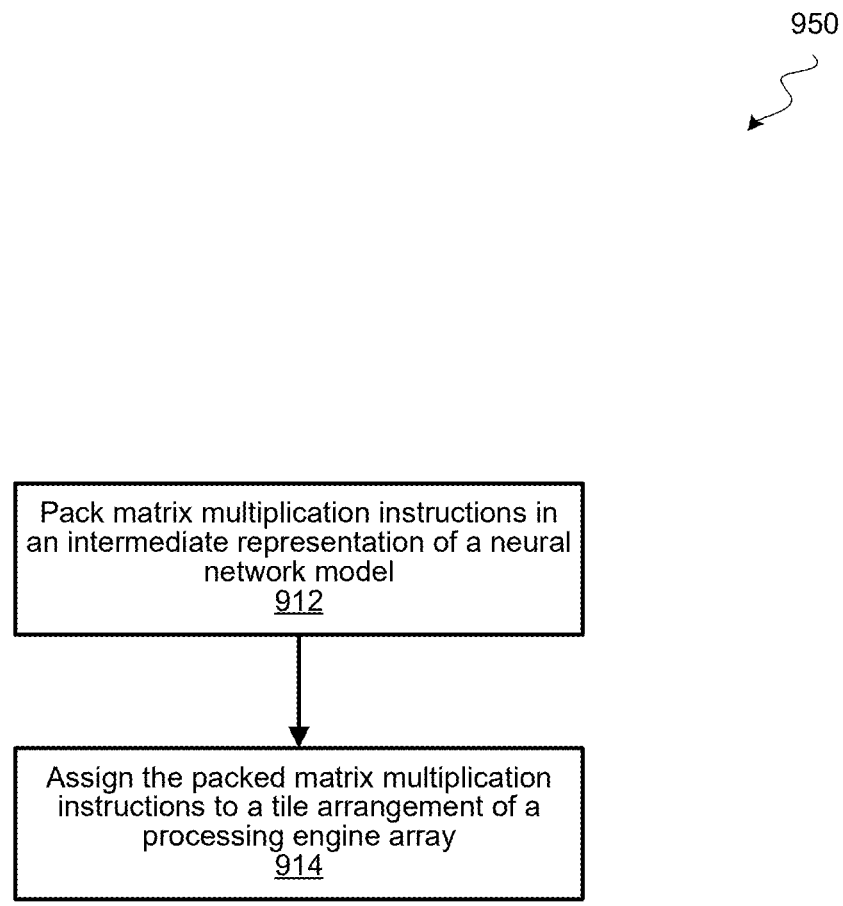
FIG. 9B illustrates a flow diagram of an example of a process for vectorizing matrix multiplication instructions.

FIG. 9B illustrates a flow diagram of an example of a process 950 for vectorizing the matmul instructions. Process 950 can be performed, for example, by a compiler. In some implementations, at least some of process 950 can be performed as part of block 906 of process 900. Process 950 can be implemented on a computer-readable medium that is executable by one or more processors of a computing system to compile the programming code of a neural network model for loading onto the integrated circuit device for execution.

At block 912, matmul instructions in the IR are packed together to form accumulation group (AG) packs that can be tiled on a processing engine array. For example. the matmul packing process may involve obtaining a representation of a data dependency graph (DDG) of the neural network model based on the IR, and identifying AGs having one or more matmul instructions in the data dependency graph. Each AG can be initialized as an AG pack, and the AG packs can be combined to form new AG packs based on a set of packing criteria and a similarity metric. The DDG can then be reordered to place the AGs in each new AG pack together.

At block 914, the packed matmul instructions can be assigned to a tile arrangement of a processing engine (PE) array. For example, assigning the matmul instructions to PE tiles may involve obtaining a representation of a DDG having an AG pack of AGs (e.g., can be the reordered DDG from block 906). A representation of a memory location base partition constraint graph (mlBPCG) of the AG pack can be generated, and a representation of an AG row group constraint graph (agRGCG) can be generated based on the mlBPCG. The AGs of the AG pack can then be assigned to tiles of the PE array based on the constraints in the agRGCG.

Figure 10:
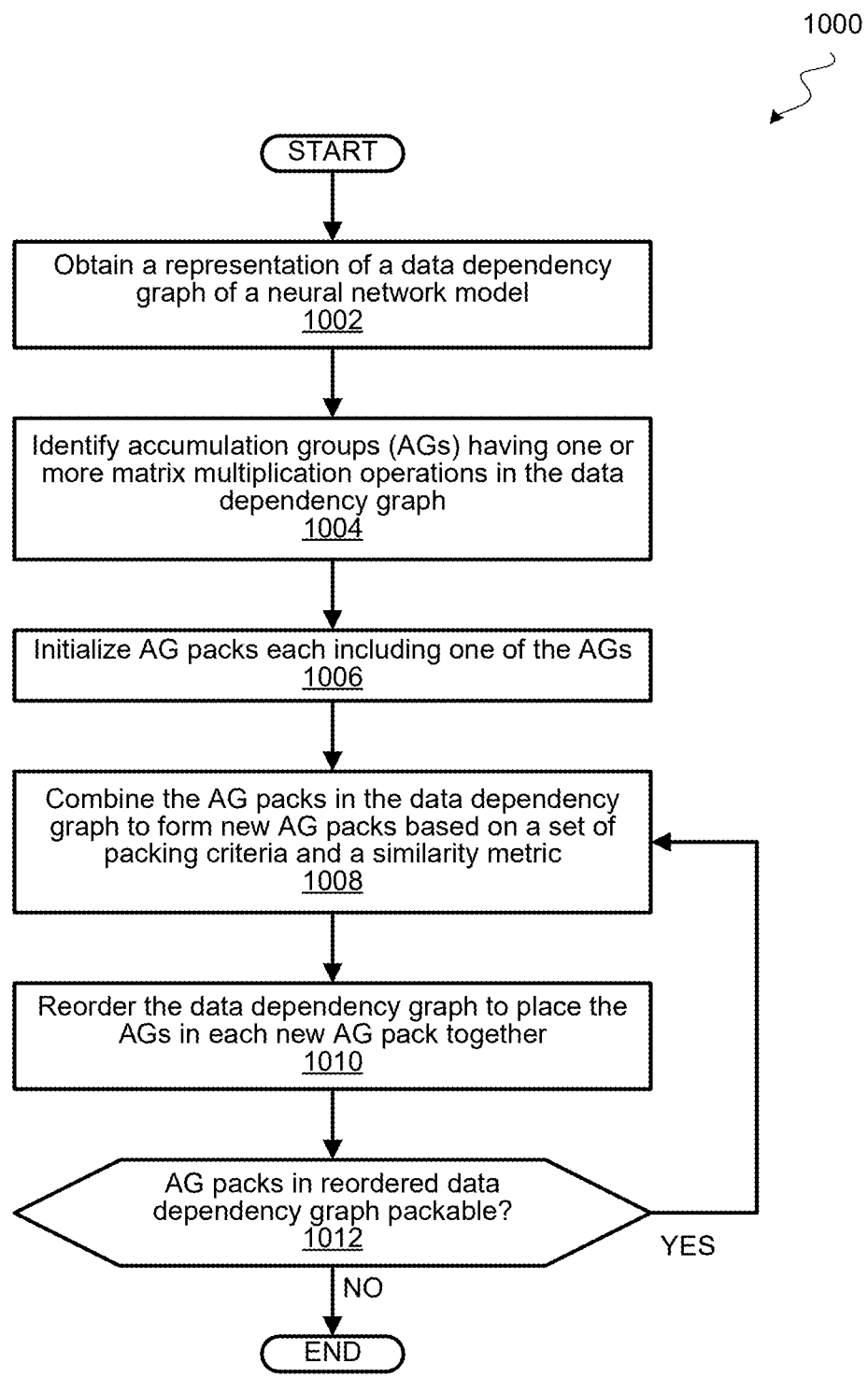
FIG. 10 illustrates a flow diagram of an example of a process for packing matrix multiplication instructions.

FIG. 10 illustrates a flow diagram of an example of a process 1000 for packing matmul instructions. Process 1000 can be performed, for example, by a compiler that interprets programming code describing the neural network model, and translates the programming code into machine instructions for execution on hardware (e.g., an integrated circuit device such as an acceleration engine). Process 1000 can be implemented on a computer-readable medium that is executable by one or more processors of a computing system to compile the programming code of a neural network model for loading onto the integrated circuit device for execution. In some implementations, process 1000 can be performed in the backend stage of the compiler before the scheduler. Process 1000 can be used, for example, to implement block 912 of process 950.

Process 1000 may begin at block 1002 by obtaining a representation of a data dependency graph (DDG) of the neural network model. The DDG can be generated based on the IR of the neural network model. The IR inputted into process 1000 may have already undergone various optimizations, and can be a low-level IR with the loop nests unrolled. The DDG can be represented as a straight-line sequence of nodes representing instructions, and edges connecting the nodes indicating data dependencies between the instructions. At block 1004, accumulation groups (AGs) within a search window having one or more matmul instructions can be identified in the DDG. For example, matmul instructions that accumulate to the same partial sum buffer bank can be identified as an AG. At block 1006, each AG can be initialized into its own AG pack, which is a data structure representing AGs to be reordered into a consecutive sequence of matrix multiplication instructions.

At block 1008, the AG packs can be combined or packed to form new and larger AG packs based on a set of packing criteria and a similarity metric. The packing process may include identifying AG pack pairs that are within a search window distance in the data dependency graph. The search window size can be a configurable parameter in the compiler. A set of packing candidates can be formed from AG pack pairs that satisfy the set of packing criteria, with each packing candidate containing an AG pack pair. A set of operations can then be iteratively performed on the packing candidates until all packing candidates are pruned from the set of packing candidates. This set of operations may including selecting a packing candidate having an AG pack pair that are most similar to each other, forming a new AG pack by grouping the AG packs in the selected packing candidate together, and pruning packing candidates from the set of packing candidates having at least one of the AG packs in the selected packing candidate. In some implementations, a data structure such as a heap can be used to track the grouping or packing of the AG packs.

In some implementations, the set of packing criteria may include a criterion that the AG packs of a packing candidate being unreachable in the data dependency graph. For example, a DDG transitive closure of the AGs within the search window can be generated to facilitate the determination of whether two AG packs are reachable. The set of packing criteria may include a criterion that the AG packs of a packing candidate be able to fit in a tile arrangement that is supported for the PE array. For example, the PE array may support tiling of 32×32 matrix multiplications, but 96×96 matrix multiplications. Hence, only combinations that are supported by the hardware are considered.

To improve throughput and performance, the set of packing criteria may optionally include a criterion that the AG packs of a packing candidate having a tensor size that is larger than an instruction fetch latency threshold (e.g., 40 cycles). For example, in some implementations, it takes one clock cycle to shift in a column-wise element into the PE array from the state buffer. Hence, a tensor having at least 40 columns can be sufficient to hide an instruction fetch latency of 40 clock cycles. The set of packing criteria may also optionally include a criterion that the AG packs of a packing candidate having an identical weight tensor shape. Having an identical weight tensor shape may avoid incurring additional cycles to reshape the tensor in the PE array.

In some implementations, the similarity metric used to determine the closeness in similarity between two AG packs can be represented as a prioritized list of attributes of the AG packs of the packing candidate. These attributes may include an instruction proximity measurement in the data dependency graph of the AG packs of the packing candidate, a comparison of the innermost loop IDs of the AG packs of the packing candidate, a comparison of the feature map sizes of the AG packs of the packing candidate, and/or a comparison of the number of matrix multiplications in the AG packs of the packing candidate. In some implementations, the instruction proximity measurement can be given the highest priority.

At block 1010, the DDG can be reordered to place the AGs in each new AG pack together. In other words, the matmul instructions belonging to the same AG pack are rearranged in the DDG to be next to each other without any intervening instructions. In some implementations, multiple passes of process 1000 can be performed. For example, at block 1012, a determination can be made as to whether the AG packs in the reordered DDG can be packed further. This determination can be made based on whether any pair of AG packs in the reordered DDG satisfy the set of packing criteria. If the AG packs in the reordered DDG can be packed further, process 1000 may return back to block 1008 to process the reordered DDG to combine the updated AG packs in the reordered DDG based on the same set of packing criteria and similarity metric. The packing process can be iteratively performed, for example, until no additional packing can be achieved (e.g., the AG packs in the DDG can no long meet the set of packing constraints). In some implementations, the process can be performed for a predetermined number of iterations, and the predetermine number can be a configurable parameter in the compiler.

Figure 11:
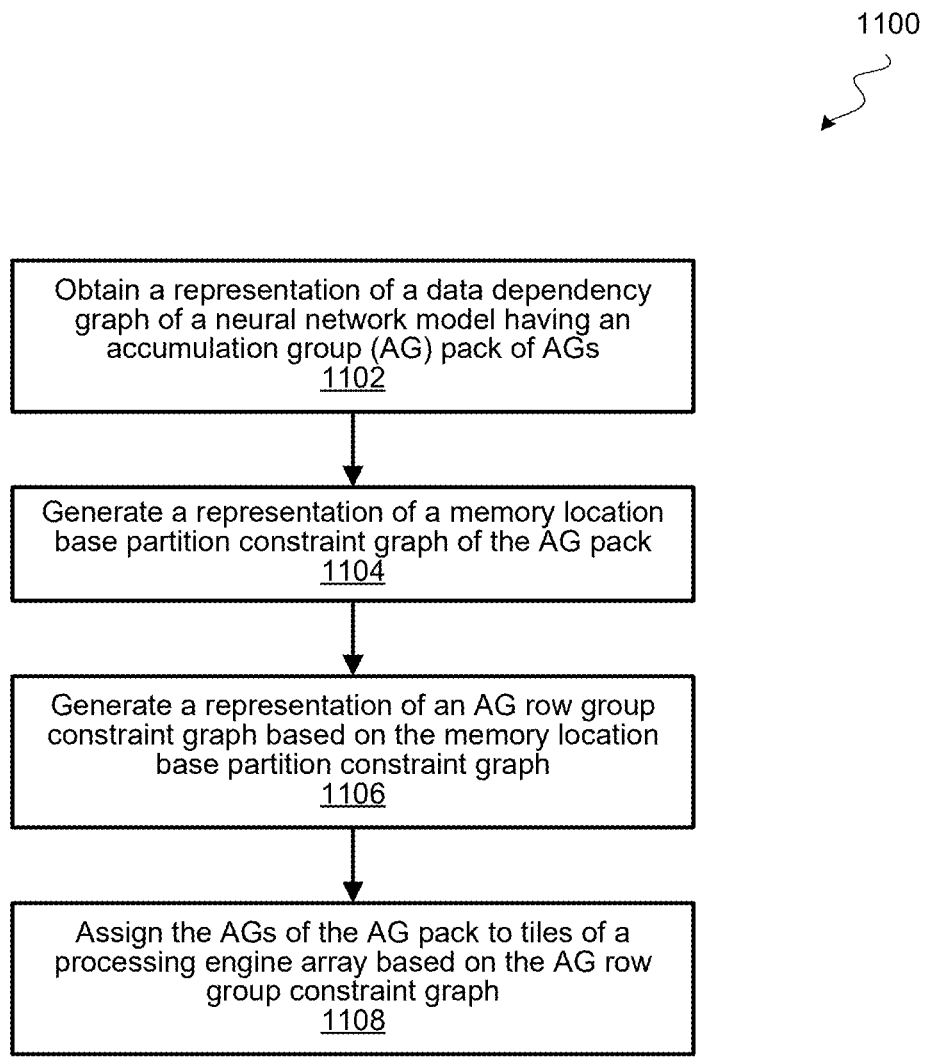
FIG. 11 illustrates a flow diagram of an example of a process for tile assignment.

FIG. 11 illustrates a flow diagram of an example of a process 1100 for assigning matmul instructions to tiles of a processing engine (PE) array. Process 1100 can be performed, for example, by a compiler that interprets programming code describing the neural network model, and translates the programming code into machine instructions for execution on hardware (e.g., an integrated circuit device such as an acceleration engine). Process 1100 can be implemented on a computer-readable medium that is executable by one or more processors of a computing system to compile the programming code of a neural network model for loading onto the integrated circuit device for execution. In some implementations, process 1100 can be performed in the backend stage of the compiler before the scheduler. Process 1100 can be used to implement, for example, block 914 of process 950.

Process 1100 may begin at block 1102 by obtaining a representation of a data dependency graph (DDG) of the neural network model having an accumulation group (AG) pack of accumulation groups (AGs). Each AG may include one or more matmul instructions, and the AGs may be arranged contiguously in the DDG. In some implementations, the DDG can be a reordered DDG resulting from the matmul instruction packing process such as process 1000. In some implementations, the DDG can be a DDG generated from an IR of a neural network model that has not been subjected to a matmul instruction packing process, but may natively contain adjacent matmul instructions forming an AG pack. In some implementations, the matmul instructions can be associated with an AG pack identifier such that matmul instructions belonging to the same AG pack may have the same AG pack identifier.

At block 1104, a representation of a memory location base partition constraint graph (mlBPCG) of the AG pack is generated. The mlBPCG can be generated by determining a base partition constraint of the tensors of a matmul instruction in an AG, and assigning the base partition constraint to an edge between the tensors. The tensors of a matmul instruction can be a feature map tensor and a weight tensor, and the base partition constraint can be determined for the pair of tensors in each matmul instruction in the AG pack. The base partition constraint can be determined as the difference in the base partition of the tensors being multiplied in the matmul instruction. The edges between corresponding tensors of each matmul instruction can be referred to as the seeding edges.

In addition to the seeding edges, a transitive base partition constraint between tensors of different AGs can be determined, and the transitive base partition constraint can be added to an edge between the tensors of the different AGs. These additional edges or transitive edges are added between tensors that are not part of a matmul instruction, but have a reachable path along the seeding edges. The transitive base partition constraint between two tensors can be determined as the sum of the base partition constrains along the seeding paths connecting the two tensors.

At block 1106, a representation of an AG row group constraint graph (agRGCG) is generated based on the memory location base partition constraint graph. The agRGCG can be generated by, for each pair combination of AGs in the AG pack, determining a row constraint between the two AGs, and assigning the row constraint to an edge between the two AGs. The row constraint between two AGs can be determined as the sum of the base partition constraint between the corresponding tensors of the AGs as determined from the mlBPCG and a starting row offset between those tensors of the AGs. The corresponding tensors can be the respective feature map tensors of the two AGs, or the respective weight tensors of the two AGs.

Figure 12:
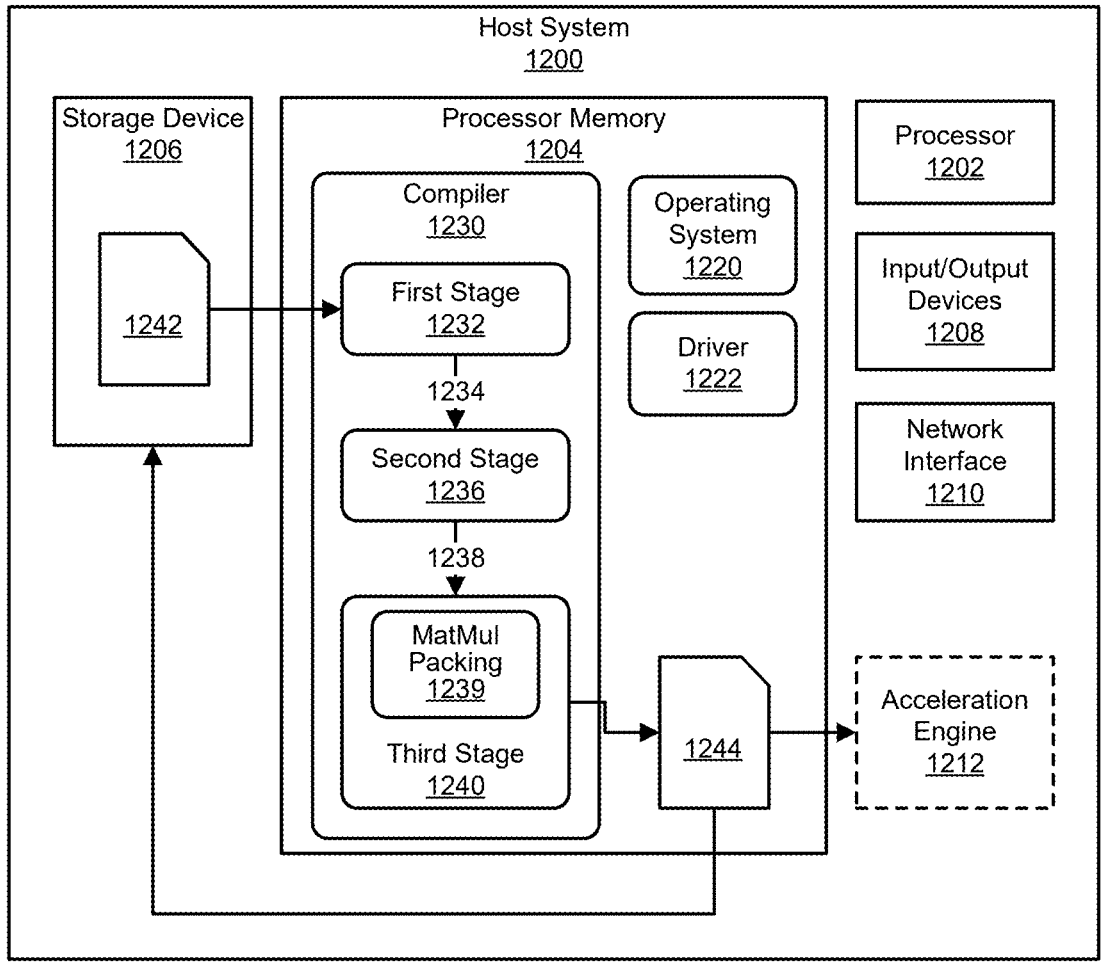
FIG. 12 illustrates a block diagram of an example of a compiler in a host system.

At block 1108, the AGs of the AG pack are assigned to the tiles of the PE array based on the agRGCG. For example, the row constraints between AGs in the agRGCG can be used in an objective function, which is minimized to find the suitable tile position for each AG. In some implementations, the AGs of an AG pack can be assigned in descending order of tensor size such that AGs with larger tensor sizes are assigned before AGs with smaller tensor sizes. The tile assignment can also take into account the state buffer pressure. Subsequent to assigning tiles of a PE array to the AGs of an AG pack, unpacked AGs (e.g. matmul instruction that is not part of a larger AG pack) that share a tensor with an AG pack can be assigned to a tile position that is consistent with the tile assignment of the AG pack for the shared tensor. The assigned tile position for each matmul instruction can be inserted into the instruction itself to facilitate the subsequent compilation phases such as scheduling and allocation, and machine instructions for executing the neural network model on the PE array can be generated based on the tile assignment of the AGs FIG. 12 illustrates a block diagram of an example of a host system 1200 on which a compiler 1230 can run. The illustrated host system 1200 is an example of a computing device, and includes a processor 1202, a processor memory 1204, at least one storage device 1206, various Input/Output (I/O) devices 1208, and at least one network interface 1210. In the example of FIG. 12, the host system 1200 also includes an acceleration engine 1212, which is an integrated circuit device that can accelerate certain operations or computations performed by the host system 1200. In various examples, the host system 1200 can be implemented as a server in a data center, a desktop computer, a laptop computer, a tablet computer, or a smartphone, among other examples. In some examples, operations or components discussed below as being performed or included in the host system 1200 can be performed or included in other computer devices. For example, the compiler 1230 can execute on the host system 1200 while the acceleration engine 1212 is located in a different host system or different computing device.

The processor 1202 is an integrated circuit device that can execute program code, in the form of instructions. The program code can be for various software applications or tools, such as an operating system 1220 or the illustrated compiler 1230. While the processor 1202 is executing a program, the instructions for the program can be stored in the processor memory 1204. The instructions can also be stored elsewhere, such as on the storage device 1206, and can be loaded into the processor memory 1204 when needed by the processor 1202. The processor 1202 can also use the processor memory 1204 for temporary storage of other data that the processor 1202 is operating on. In various examples, the processor memory 1204 is a volatile memory type, such as a type of random access memory, though non-volatile memory types can, alternatively or additionally, be used for the processor memory 1204.

The storage device 1206 is an example of a device that can include non-volatile memory. For example, the storage device 1206 can be a magnetic disk drive, a solid-state drive, or an optical drive, among other examples. Program code and other data stored on the storage device 1206 can remain present when the storage device 1206 is not powered on. Storage device 1206 can be used as a type of non-transitory storage medium, or may include a reader that can access non-transitory storage medium.

The storage device 1206 is one example of a peripheral device. A peripheral device is a component that can be coupled to the host system 1200 to add functionality to the host system 1200. Other examples of peripheral devices include Input/Output devices 1208 and network interface 1210. The Input/Output devices 1208 can include user input and/or output devices, such as keyboard, mouse, pointer, touchpad, touchscreen, microphone, display screen, speaker, printer, and scanner, among other examples. Network interface 1210, which can be implemented using a network interface card, can provide access to one or more networks. Network interface 1210 can include, for example, a physical port for connecting a network cable and/or one or more antennas and/or radios for wireless communication such as Wi-Fi, cellular, and/or other over-the-air networks. Network interface 1210 can also be described as an I/O device.

The acceleration engine 1212 is also another type of peripheral device or I/O device. The acceleration engine 1212 is a device that is purpose-built to perform certain operations that can be performed by the processor 1202, but can be performed faster by the acceleration engine 1212. For example, the acceleration engine 1212 can be a neural network accelerator that is capable of performing large scale, parallel computations of a neural network more efficiently than when the computations are performed by the processor 1202. As another example, the acceleration engine 1212 can be a graphics processing unit (GPU), and may be optimized to perform the computations needed for graphics rendering. Other examples of devices that can be implemented by the acceleration engine 1212 include cryptographic accelerators, compression and decompression accelerators, 3-D accelerators, regular expression accelerators, security accelerators, and others.

In various examples, the acceleration engine 1212 can execute program code to perform certain operations. For example, when the acceleration engine 1212 is a neural network accelerator, the acceleration engine 1212 can be programmed to execute a particular neural network model, such as one that performs image recognition or one that performs machine translation. As a further example, to support the execution of a neural network model, the acceleration engine 1212 can be programed to perform operations such as copying data for the neural network between processor memory 1204 and the acceleration engine 1212 (e.g., copying input data for the neural network from processor memory 1204 into the acceleration engine 1212, copying results from the acceleration engine 1212 into the processor memory 1204, etc.).

To generate program code for the acceleration engine 1212, the host system 1200 can execute the compiler 1230. Compilers, in general, are software programs that translate program code written in a human-readable language into a format (e.g., machine instructions) that can be read and processed by an integrated circuit device. In the example of FIG. 12, the acceleration engine 1212 can be a neural network accelerator, and the compiler 1230 can be a compiler for compiling a neural network description into instructions to be executed by the acceleration engine 1212. When the acceleration engine 1212 implements a different type of accelerator, a different compiler can be used.

The compiler 1230 can be activated, for example, when the operating system 1220 receives keyboard, mouse, touchscreen, voice command, or other inputs from the Input/Output devices 1208. The inputs can further include parameters for the compiler 1230, such as input code 1242 to compile and configuration options for the compilation process. Once the compiler 1230 is activated, the processor 1202 can load the instructions for the compiler 1230 into the processor memory 1204, and execute the compiler from the processor memory 1204. In some implementations, compiler 1230 may identifying steps to be performed by the processor 1202, rather than by the acceleration engine 1212. For example, the processor 1202, through the execution of a driver 1222, may need to perform steps such as configuring Direct Memory Access (DMA) descriptors for moving data into or out of the acceleration engine 1212, among other examples.

In the example of FIG. 12, the compiler 1230 includes a first stage 1232, a second stage 1236, and a third stage 1240, which each perform different operations to produce compiled code 1244. In other examples, the compiler 1230 can combine the operations of the first stage 1232, second stage 1236, and/or third stage 1240 into fewer stages, or can divide the operations of one or more of the stages into multiple stages. In some implementations, compiler 1230 can also be modified such that certain operation(s) from one stage can be executed in a different stage.

The first stage 1232 (may also be referred to as the front stage) can receive and process input code 1242. The input code 1242 can describe a program in a high-level programming language, such as Python, Java, C++, among other examples, and may utilize software libraries tailored for neural networks such as TensorFlow, PyTorch, etc. The input code 1242 can be a description of a neural network model that describe, for example, steps to perform image recognition, speech recognition, machine translation, or other operations. The input code 1242 can be obtained from the storage device 1206. Alternatively, though not illustrated, the input code 1242 can be located in the processor memory 1204, or can be obtained from a network location using the network interface 1210.

Processing of the input code 1242 can include parsing the input code 1242, performing syntax and semantic analysis on the input code 1242 to identify operators (e.g., operations such as computations, memory accesses, and/or other functions, etc.) described in the input code 1242, and sorting the operators described in the input code 1242. For example, the operators described in the input code 1242 can be sorted into layers, where the outputs of one layer provide the inputs to a next layer. The output of the first stage 1232 can be an intermediate representation (IR) 1234 of the input code 1242. In some implementations, the IR 1234 can be code representing a compute graph (e.g., data flow graph, data dependency graph, etc.). The compute graph may include nodes and edges connecting the nodes. The nodes may represent operators such as computations, data rearrangements such as transformations, memory accesses, and/or other operations; and the edges or connections between the nodes may represent dependencies between the nodes, such as data dependencies, memory dependencies, or operational dependencies, among other examples. The compute graph can be organized, for example, in the layers, nodes, and connections between nodes of a neural network model.

The second stage 1236 (may also be referred to as the middle-end stage) can perform intermediate processing on the IR 1234 output from the first stage 1232. The intermediate processing may include performing various optimizations on the IR 1234. The optimizations may include target independent optimizations that are hardware agnostic, and/or target specific optimizations that are tailored for the hardware architecture executing the program of input code 1242. Target independent optimizations may include algebraic simplification, graph minimization such as removal of unnecessary or redundant operations and/or dependencies, high-level dependency optimization by rearranging operators to improve compute latencies, etc.

Target specific optimizations include optimizations that take into account the capabilities of the hardware (e.g., acceleration engine 1212) that the input code is being compiled for. Such optimizations may include operators fusion to fuse multiple operators into an execution kernel supported by the hardware, data layout transformation to efficiently fit data into the hardware, etc. The target specific optimizations may take into account considerations such as whether the operations being performed in any one layer, or at any one node in a layer, may be too many for the acceleration engine 1212 to perform at the same time. The acceleration engine 1212 may, for example, have a limited amount of local storage space for the data needed for a computation, or the computations may be more than the acceleration engine 1212 can perform at one time. In such scenario, the operators of the layer or node can be broken down into smaller operations, which can fit into the acceleration engine's local memory and/or can fit into the computing capacity of the acceleration engine 1212. The output of the second stage 1236 can be an optimized IR 1238 such as code representing an optimized compute graph.

The third stage 1240 (may also be referred to as the back-end stage) can operate on the output 1238 of the second stage 1236, and perform various steps before producing the instructions (e.g., machine code) that are to be executed by the acceleration engine 1212. These steps can include instruction and data scheduling, register allocation, and/or code generation. In some implementations, matmul packing 1239 such as the packing techniques disclosed herein can be performed in the third stage 1240 of the compiler, for example, before the scheduler.

Instruction and data scheduling determines the order in which instructions are executed and data are processed by the acceleration engine 1212, and may include low-level dependency optimization by rearranging operations to improve parallel execution, handling dependencies between nodes by inserting synchronization instructions into the code, etc. Register allocation may include identifying optimizations in register usage and/or memory bandwidth usage to avoid spilling, and reordering of register and/or memory accesses to hide access latencies given the memory capacity of the hardware, etc. Code generation converts the low-level optimized IR into machine code executable by the acceleration engine 1212, and includes mapping operations into hardware instructions according to the architecture of the acceleration engine 1212. The output of the third stage 1240 is compiled code 1244, which may include machine instructions in binary format. In some examples, the compiled code 1244 can be stored in the processor memory 1204. Alternatively or additionally, the compiled code 1244 can be copied to the storage device 1206 or to a network location. As noted above, the acceleration engine 1212 may be located at a different host system, in which case the compiled code 1244 can be sent over the network interface 1210 to the other host system.

In the example of FIG. 12, the host system 1200 can be executing a driver 1222, which can also be referred to as a device driver or runtime driver, that manages the acceleration engine 1212. The driver 1222 can provide an interface between applications executing on the host system 1200 (or on another host system) and the acceleration engine 1212. For example, the driver 1222 can provide an Application Program Interface (API) that defines functions for feeding input data to the acceleration engine 1212 and defining the operation to perform on the input data. In this and other examples, the driver 1222 can configure the acceleration engine 1212 to perform the operation. For example, the driver 1222 can identify a neural network model that the acceleration engine 1212 is to execute, as well as the location in the processor memory 1204 or on the storage device 1206 where the compiled code 1244 for the neural network model is located. The driver 1222 can further load into the acceleration engine 1212 or cause the acceleration engine 1212 to load the compiled code 1244, can load or cause the acceleration engine 1212 to load the input data on which the neural network model is to operate, and/or can cause the acceleration engine 1212 to being executing on the input data. Once the acceleration engine 1212 has finished, the acceleration engine 1212 can notify the driver 1222, and the driver 1222 can deliver a result back to the application that requested the result.

Figure 13:
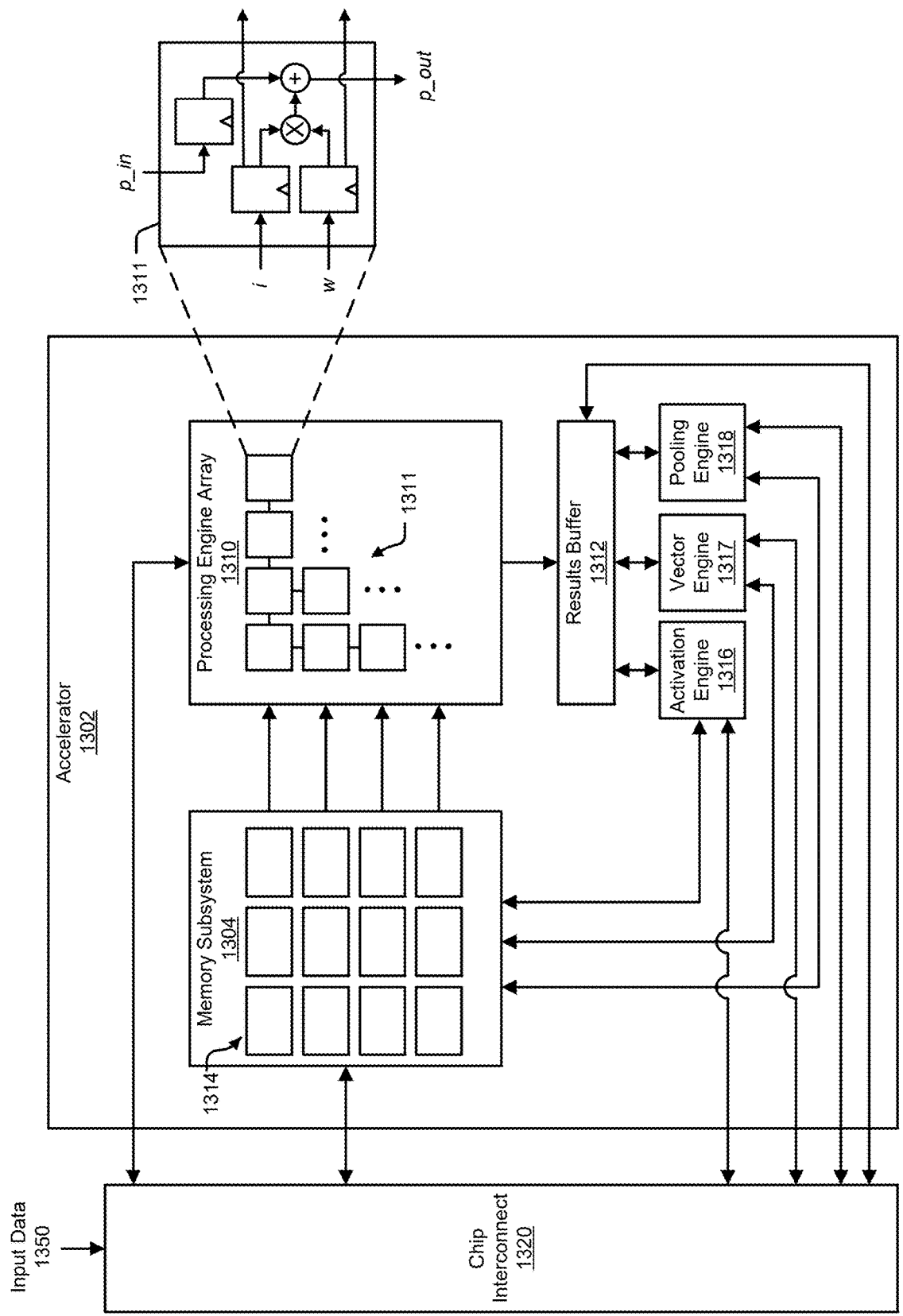
FIG. 13 illustrates a block diagram of an example of an integrated circuit device.

FIG. 13 is a block diagram illustrating an example of an integrated circuit device that can include a PE array with tiling support. The example of FIG. 13 illustrates an accelerator 1302. In various examples, the accelerator 1302, for a set of input data (e.g., input data 1350), can execute computations using a processing engine array 1310, an activation engine 1316, a vector engine 1317, and/or a pooling engine 1318. In some examples, the example accelerator 1302 may be an integrated circuit component of a processor, such as a neural network processor. The processor may have other integrated circuit components, including additional accelerator engines.

In various implementations, the memory subsystem 1304 can include multiple memory banks 1314. In these implementations, each memory bank 1314 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 1314. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 1304 can permit simultaneous access to the read or write channels of multiple memory banks. As another example, the memory subsystem 1304 can include arbitration logic such that arbitration between, for example, the outputs of multiple memory banks 1314 can result in more than one memory bank's output being used. In these and other examples, though globally managed by the memory subsystem 1304, each memory bank can be operated independently of any other.

Having the memory banks 1314 be independently accessible can increase the efficiency of the accelerator 1302. For example, values can be simultaneously read and provided to each row of the processing engine array 1310, so that the entire processing engine array 1310 can be in use in one clock cycle. As another example, the memory banks 1314 can be read at the same time that results computed by the processing engine array 1310 are written to the memory subsystem 1304. In contrast, a single memory may be able to service only one read or write at a time. With a single memory, multiple clock cycles can be required, for example, to read input data for each row of the processing engine array 1310 before the processing engine array 1310 can be started.

In various implementations, the memory subsystem 1304 can be configured to simultaneously service multiple clients, including the processing engine array 1310, the activation engine 1316, the vector engine 1317, the pooling engine 1318, and any external clients that access the memory subsystem 1304 over a communication fabric 1320. In some implementations, being able to service multiple clients can mean that the memory subsystem 1304 has at least as many memory banks as there are clients. In some cases, each row of the processing engine array 1310 can count as a separate client. In some cases, each column of the processing engine array 1310 can output a result, such that each column can count as a separate write client. In some cases, output from the processing engine array 1310 can be written into the memory banks 1314 that can then subsequently provide input data for the processing engine array 1310. As another example, the activation engine 1316, the vector engine 1317, and the pooling engine 1318 can include multiple execution channels, each of which can be separate memory clients. The memory banks 1314 can be implemented, for example, using static random access memory (SRAM).

In various implementations, the memory subsystem 1304 can include control logic. The control logic can, for example, keep track of the address spaces of each of the memory banks 1314, identify memory banks 1314 to read from or write to, and/or move data between the memory banks 1314. In some implementations, memory banks 1314 can be hardwired to particular clients. For example, a set of memory banks 1314 can be hardwired to provide values to the rows of the processing engine array 1310, with one memory bank servicing each row. As another example, a set of memory banks can be hard wired to receive values from columns of the processing engine array 1310, with one memory bank receiving data for each column.

The processing engine array 1310 is the computation matrix of the example accelerator 1302. The processing engine array 1310 can, for example, execute parallel integration, convolution, correlation, and/or matrix multiplication, among other things. The processing engine array 1310 includes multiple processing engines 1311, arranged in rows and columns, such that results output by one processing engine 1311 can be input directly into another processing engine 1311. Processing engines 1311 that are not on the outside edges of the processing engine array 1310 thus can receive data to operate on from other processing engines 1311, rather than from the memory subsystem 1304.

In various examples, the processing engine array 1310 uses systolic execution, in which data arrives at each processing engine 1311 from different directions at regular intervals. In some examples, input data can flow into the processing engine array 1310 from the left and weight values can be loaded at the top. In some examples weights and input data can flow from the left and partial sums can flow from top to bottom. In these and other examples, a multiply-and-accumulate operation moves through the processing engine array 1310 as a diagonal wave front, with data moving to the right and down across the array. Control signals can be input at the left at the same time as weights, and can flow across and down along with the computation.

In various implementations, the number of columns in the processing engine array 1310 determines the computational capacity of the processing engine array 1310, and the number of rows determines the required memory bandwidth for achieving maximum utilization of the processing engine array 1310. The processing engine array 1310 can have, for example, 64 columns and 128 rows, or some other number of columns and/or rows.

An example of a processing engine 1311 is illustrated in FIG. 13 in an inset diagram. As illustrated by this example, a processing engine 1311 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 1311.

In the illustrated example, an input from above can include a partial sum, p_in, provided either from another processing engine 1311 or from a previous round of computation by the processing engine array 1310. When starting a computation for a new set of input data, the top row of the processing engine array 1310 can receive a fixed value for p_in, such as zero. As illustrated by this example, i and w are multiplied together and the result is summed with p_in to produce a new partial sum, p_out, which can be input into another processing engine 1311. Various other implementations of the processing engine 1311 are possible.

Outputs from the last row in the processing engine array 1310 can be temporarily stored in the results buffer 1312. The results can be intermediate results, which can be written to the memory banks 1314 to be provided to the processing engine array 1310 for additional computation. Alternatively, the results can be final results, which, once written to the memory banks 1314 can be read from the memory subsystem 1304 over the communication fabric 1320, to be output by the system.

In some implementations, the accelerator 1302 includes an activation engine 1316. In these implementations, the activation engine 1316 can combine the results from the processing engine array 1310 into one or more output activations. For example, for a convolutional neural network, convolutions from multiple channels can be summed to produce an output activation for a single channel. In other examples, accumulating results from one or more columns in the processing engine array 1310 may be needed to produce an output activation for a single node in the neural network. In some examples, activation engine 1316 can be bypassed.

In various examples, the activation engine 1316 can include multiple separate execution channels. In these examples, the execution channels can correspond to the columns of the processing engine array 1310, and can perform an operation on the outputs of a column, the result of which can be stored in the memory subsystem 1304. In these examples, the activation engine 1316 may be able to perform between 1 and n parallel computations, where n is equal to the number of columns in the processing engine array 1310. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 1302 can include a pooling engine 1318. Pooling is the combining of outputs of the columns of the processing engine array 1310. Combining can include for example, computing a maximum value, a minimum value, an average value, a median value, a summation, a multiplication, or another logical or mathematical combination. In various examples, the pooling engine 1318 can include multiple execution channels that can operating on values from corresponding columns of the processing engine array 1310. In these examples, the pooling engine 1318 may be able to perform between 1 and n parallel computations, where n is equal to the number of columns in the processing engine array 1310. In various examples, execution channels of the pooling engine 1318 can operate in parallel and/or simultaneously. In some examples, the pooling engine 1318 can be bypassed.

In some implementations, the accelerator 1302 can further include a vector engine 1317. Vector engine 1317 is a compute engine that can perform computations and manipulations on values stored in memory subsystem 1304 and/or results buffer 1312 such as values representing matrices of input values, weight values, intermediate results, etc. Vector engine 1317 can include multiple execution channels each with a pipeline of computation circuit blocks (e.g., arithmetic logic units) to perform complex computations such as nested multiply-and-add operations and/or complex manipulations such as sorting operations. In various examples, execution channels of the vector engine 1317 can operate in parallel and/or simultaneously. In some examples, the vector engine 1317 can be bypassed or be omitted.

Herein, the activation engine 1316, the vector engine 1317, and the pooling engine 1318 may be referred to collectively as execution engines. The processing engine array 1310 is another example of an execution engine. Another example of an execution engine is a Direct Memory Access (DMA) engine, which may be located outside the accelerator 1302.

Input data 1350 can arrive over the communication fabric 1320. The communication fabric 1320 can connect the accelerator 1302 to other components of a processor, such as a DMA engine that can obtain input data 1350 from an Input/Output (I/O) device, a storage drive, or a network interface. The input data 1350 can be, for example one-dimensional data, such as a character string or numerical sequence, or two-dimensional data, such as an array of pixel values for an image or frequency and amplitude values over time for an audio signal. In some examples, the input data 1350 can be three-dimensional, as may be the case with, for example, the situational information used by a self-driving car or virtual reality data. In some implementations, the memory subsystem 1304 can include a separate buffer for the input data 1350. In some implementations, the input data 1350 can be stored in the memory banks 1314 when the accelerator 1302 receives the input data 1350.

In some examples, the accelerator 1302 can implement a neural network processing engine. In these examples, the accelerator 1302, for a set of input data 1350, can execute a neural network to perform a task for which the neural network was trained. Executing a neural network on a set of input data can be referred to as inference or performing inference.

The weights for the neural network can be stored in the memory subsystem 1304, along with input data 1350 on which the neural network will operate. The neural network can also include instructions, which can program the processing engine array 1310 to perform various computations on the weights and the input data. The instructions can also be stored in the memory subsystem 1304, in the memory banks 1314 or in a separate instruction buffer. The processing engine array 1310 can output intermediate results, which represent the outputs of individual layers of the neural network. In some cases, the activation engine 1316, the vector engine 1317, and/or pooling engine 1318 may be enabled for computations called for by certain layers of the neural network. The accelerator 1302 can store the intermediate results in the memory subsystem 1304 for inputting into the processing engine array 1310 to compute results for the next layer of the neural network. The processing engine array 1310 can further output final results from a last layer of the neural network. The final results can be stored in the memory subsystem 1304 and then be copied out to host processor memory or to another location.

Figure 14:
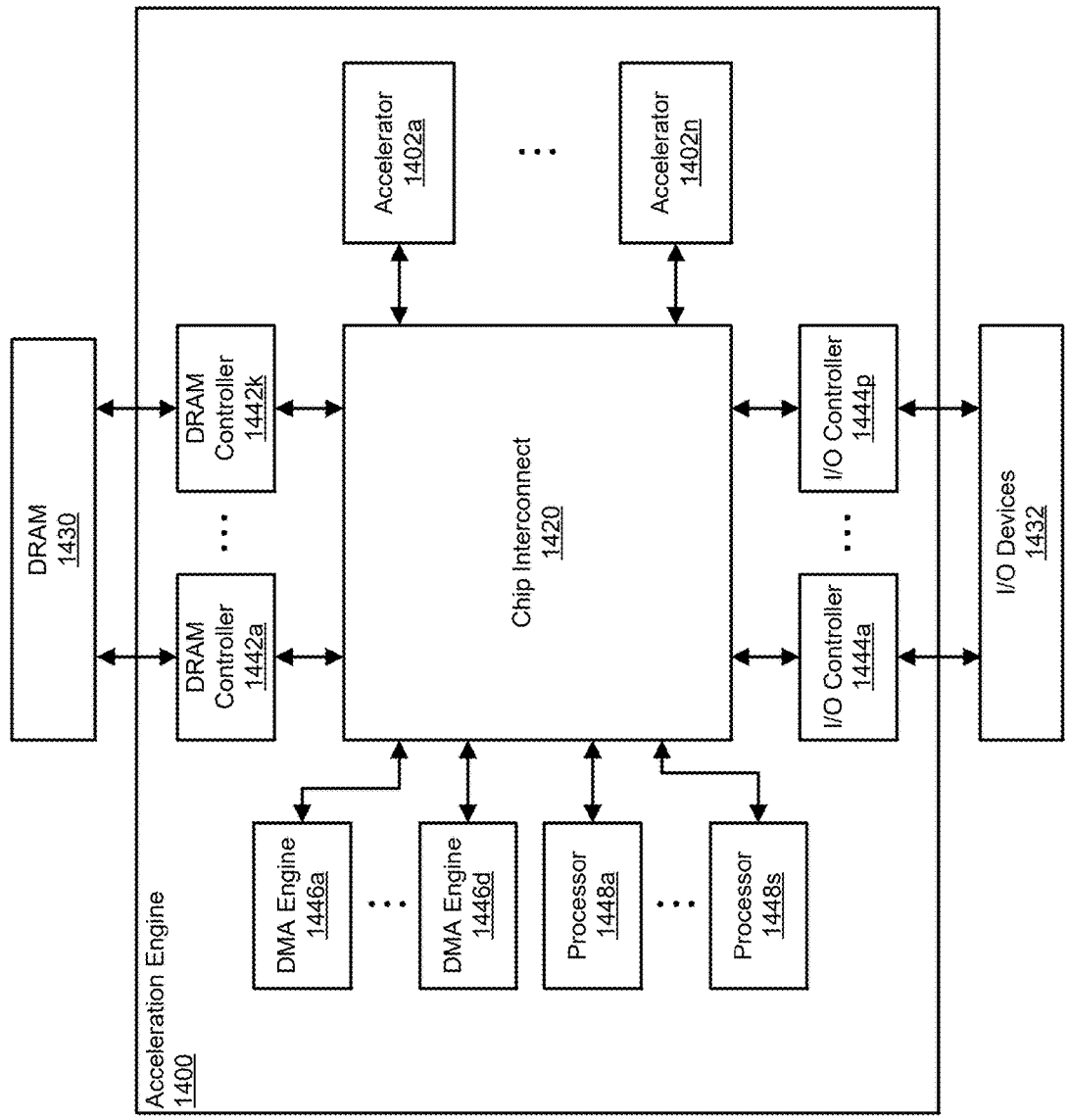
FIG. 14 illustrates a block diagram of an example of an acceleration engine.

FIG. 14 includes a block diagram that illustrates an example of an acceleration engine 1400. The acceleration engine 1400 is an example of an integrated circuit that can include one or more accelerators 1402a-1402n that may be similar to the accelerator illustrated in FIG. 13.

In the example of FIG. 14, the acceleration engine 1400 includes multiple accelerators 1402a-1402n, each of which can perform a set of operations. In various examples, the accelerators 1402a-1402n are for particular types of operations, so that the accelerators 1402a-1402n can perform the operations much faster than when similar operations are performed by a general-purpose processor. In various examples, to perform a set of operations, input data on which the operations are to be performed must first be moved into the accelerators 1402a-1402n. Additionally, in some cases, program code is also moved into the accelerators 1402a-1402n, which programs the operations that the accelerators 1402a-1402n will perform on the data. In the illustrated example, the acceleration engine 1400 includes n accelerators 1402a-1402n. Examples of accelerators that can be included in the acceleration engine 1400 include graphics accelerators, floating point accelerators, neural network accelerators, and others. In various examples, the accelerators 1402a-1402n can each be the same (e.g., each of the is a graphics accelerator) or can be different (e.g., the accelerators 1402a-1402n include a graphics accelerator, a floating point accelerator, and neural network accelerator).

The example acceleration engine 1400 further includes DRAM controllers 1442a-1442k for communicating with an external memory. The external memory is implemented, in this example, using DRAM 1430. In the illustrated example, the acceleration engine 1400 includes k DRAM controllers 1442a-1442k, each of which may be able to communicate with an independent set of banks of DRAM. In other examples, other types of RAM technology can be used for the external memory. The DRAM controllers 1442a-1442k can also be referred to as memory controllers.

In various examples, input data and/or program code for the accelerators 1402a-1402n can be stored in the DRAM 1430. Different programs can cause the accelerators 1402a-1402n to perform different operations. For example, when one of the accelerators is a neural network accelerator, one program can configure the neural network accelerator to perform speech recognition while another program can configure the neural network accelerator to perform image recognition. In various examples, different accelerators 1402a-1402n can be programmed with different programs, so that each performs a different set of operations. In various examples, the processors 1448a-1448s can manage moving of program code from the DRAM 1430 to the accelerators 1402a-1402n.

The example acceleration engine 1400 further includes I/O controllers 1444a-1444p for communicating with I/O devices 1432 in the system. The acceleration engine 1400 can communicate with I/O devices over, for example, a processor bus. In some examples, the processor bus can be implemented using Peripheral Component Interconnect (PCI) and/or a variation of the PCI bus protocol. The processor bus can connect the acceleration engine 1400 to I/O devices such as, for example, input and output devices, memory controllers, storage devices, and/or network interface cards, among other things. In some examples, the I/O controllers 1444-1444p can enable the acceleration engine 1400 to act as an I/O device for a host processor. For example, the acceleration engine 1400 can be the recipient of input data from the host processor, and a command indicating an operation to be performed on the input data (e.g., a particular computation or analysis). In the illustrated example, the acceleration engine 1400 includes p I/O controllers 1444a-1444p, each of which may include a separate root complex and may communicate with a separate set of I/O devices 1432. In other examples, other standardized bus protocols, such as Ultra Path Interconnect (UPI) can be used for the host bus. In other examples, a proprietary bus protocol can be used.

Movement of data in the acceleration engine 1400 can be managed by one or more processors 1448a-1448s, which can also be referred to as data management processors. In the example of FIG. 14, the acceleration engine 1400 includes s processors 1448a-1448s incorporated into the device (e.g., on the same silicon die). In other examples, the processors 1448a-1448s can be external to the acceleration engine 1400 (e.g., on a different die and/or in a different package). In some examples, the processors 1448a-1448s can manage the movement of data from I/O devices 1432 to the accelerators 1402a-1402n or the DRAM 1430. For example, input data may be located at an I/O device 1432 or in processor memory, and the processors 1448a-1448s can move the input from the I/O device 1432 or processor memory into an accelerator or into DRAM 1430. As another example, program code for the accelerators 1402a-1402n may be located on an I/O device 1432 or in processor memory.

The example acceleration engine 1400 further includes DMA engines 1446a-1446d that can move data between the accelerators 1402a-1402n, DRAM controllers 1442a-1442k, and I/O controllers 1444a-1444p. In the illustrated example, the acceleration engine 1400 includes d DMA engines 1446a-1446d. In some implementations, the DMA engines 1446a-1446d can be assigned to specific tasks, such as moving data from the DRAM controllers 1442a-1442d to the accelerators 1402a-1402n, or moving data between the I/O controllers 1444a-1444p and the accelerators 1402a-1402n. These tasks can be assigned, for example, by enqueueing descriptors with the DMA engines 1446a-1446d, where a descriptor identifies an address for a block of data and an operation (e.g., a read or a write) to perform. A descriptor, for example, can direct a DMA engine to instruct a DMA controller to read a block of data from DRAM 1430. A descriptor can, as a further example, instruct the DMA engine to write data, read by the DMA controller, to an accelerator. Further descriptors can be used to move data from an accelerator to DRAM 1430.

In various examples, each of the processors 1448a-1448s can be responsible for managing the data movement for a different accelerator. In some examples, a processor may manage the data movement for more than one accelerator. Similarly, in various examples, each of the processors 1448a-1448s can be assigned to one or more DMA engines 1446a-1446d. In these and other examples, associations between processors 1448a-1448s, accelerators 1402a-1402n, and DMA engines 1446a-1446d are determined by program code being executed by each respective processor.

In the example acceleration engine 1400, the various components can communicate over a chip interconnect 1420. The chip interconnect 1420 primarily includes wiring for routing data between the components of the acceleration engine 1400. In some cases, the chip interconnect 1420 can include a minimal amount of logic, such as multiplexors to control the direction of data, flip-flops for handling clock domain crossings, and timing logic.

Figure 15:
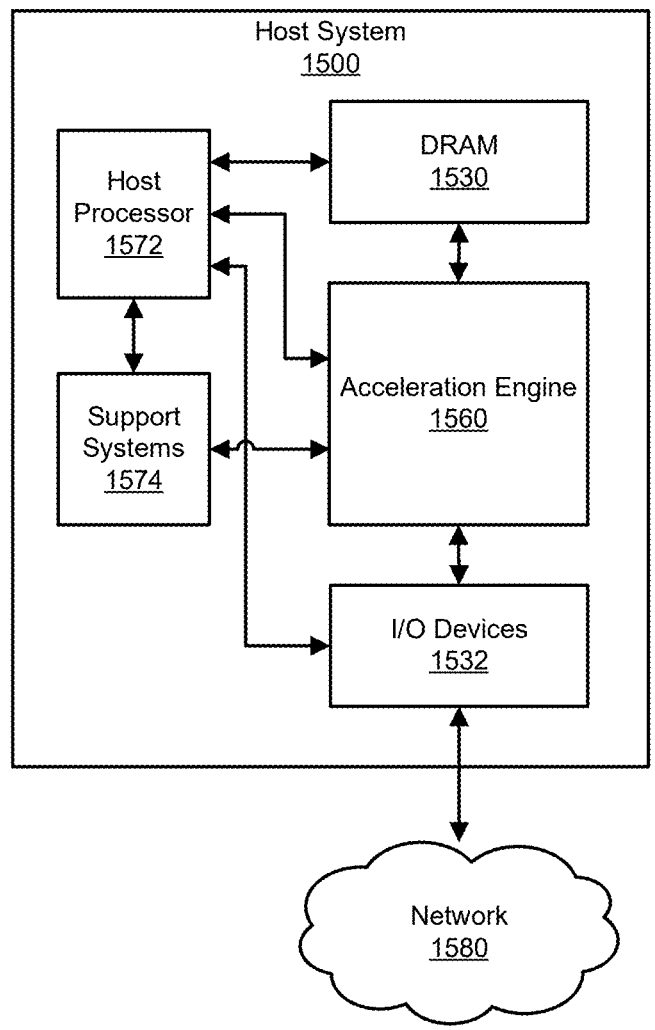
FIG. 15 illustrates a block diagram of an example of a host system.

FIG. 15 includes a block diagram that illustrates an example of a host system 1500 in which an acceleration engine 1560 can be used. The acceleration engine 1560 of FIG. 15 is an example of a device that can include one or more accelerators such as is illustrated in FIG. 14. The example host system 1500 of FIG. 15 includes the acceleration engine 1560, a host processor 1572, DRAM 1530 or processor memory, I/O devices 1532, and support systems 1574. In various implementations, the host system 1500 can include other hardware that is not illustrated here.

The host processor 1572 is a general-purpose integrated circuit that is capable of executing program instructions. In some examples, the host processor 1572 can include multiple processing cores. A multi-core processor may include multiple processing units within the same processor. In some examples, the host system 1500 can include more than one host processor 1572. In some examples, the host processor 1572 and the acceleration engine 1560 can be one chip, such as, one or more integrated circuits within the same package.

In various examples, the host processor 1572 can communicate with other components in the host system 1500 over one or more communication channels. For example, the host system 1500 can include a host processor bus, which the host processor 1572 can use to communicate with the DRAM 1530, for example. As another example, the host system 1500 can include an I/O bus, such as a PCI-based bus, over which the host processor 1572 can communicate with the acceleration engine 1560 and/or the I/O devices 1532, for example. In various examples, the host system 1500 can, alternatively or additionally, include other communication channels or busses, such as serial busses, power management busses, storage device busses, and so on.

In some examples, software programs executing on the host processor 1572 can receive or generate input for processing by the acceleration engine 1560. In some examples, the programs can select an appropriate neural network to execute for a given input. For example, a program may be for language translation, and can select one or more neural networks capable of speech recognition and/or machine translation. In these and other examples, the programs can configure the acceleration engine 1560 with the neural network to execute, and/or can select a neural network processing engine on the acceleration engine 1560 that has previously been configured to execute the desired neural network. In some examples, once the acceleration engine 1560 has started an inference on input data, the host processor 1572 can manage the movement of data (such as weights, instructions, intermediate results, results of conditional layers, and/or final results) into or out of the acceleration engine 1560.

In some examples, a software program that is using the acceleration engine 1560 to conduct an inference can read the result from a conditional layer from the acceleration engine 1560 and/or from a storage location, such as in DRAM 1530. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 1530 is memory that is used by the host processor 1572 for storage of program code that the host processor 1572 is in the process of executing, as well as values that are being operated on. In some examples, the data for a neural network (e.g., weight values, instructions, and other data) can be all or partially stored in the DRAM 1530. DRAM is a common term for processor memory, and though DRAM is volatile memory, processor memory can be volatile and/or non-volatile. Though not illustrated here, the host system 1500 can include other volatile and non-volatile memories for other purposes. For example, the host system 1500 can include a Read-Only Memory (ROM) that stores boot code for booting the host system 1500 at power on, and/or Basic Input/Output System (BIOS) code.

Though not illustrated here, the DRAM 1530 can store instructions for various programs, which can be loaded into and be executed by the host processor 1572. For example, the DRAM 1530 can be storing instructions for an operating system, one or more data stores, one or more application programs, one or more drivers, and/or services for implementing the features disclosed herein.

The operating system can manage and orchestrate the overall operation of the host system 1500, such as scheduling tasks, executing applications, and/or controller peripheral devices, among other operations. In some examples, a host system 1500 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers.

Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 1500. For example, some drivers can provide communication between the operating system and peripheral devices or I/O devices 1532. Alternatively or additionally, some drivers may provide communication between application programs and the operating system, and/or application programs and peripheral devices accessible to the host system 1500. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 1532 can include hardware for connecting to user input and output devices, such as keyboards, mice, pens, tablets, voice input devices, touch input devices, displays or monitors, speakers, and printers, among other devices. The I/O devices 1532 can also include storage drives and/or network interfaces for connecting to a network 1580. For example, the host system 1500 can use a network interface to communicate with storage devices, user terminals, other computing devices or servers, and/or other networks, among various examples.

In various examples, one or more of the I/O devices 1532 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 1500 or may be in an external enclosure. A storage device can be fixed (e.g., attached by screws) or removable (e.g., having a physical release mechanism and possibly a hot-plug mechanism).

Storage devices, the DRAM 1530, and any other memory component in the host system 1500 are examples of computer-readable storage media. Computer-readable storage media are physical mediums that are capable of storing data in a format that can be read by a device such as the host processor 1572. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 1532 can be PCI-based devices. In these examples, a PCI-based I/O device includes a PCI interface for communicating with the host system 1500. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 1574 can include hardware for coordinating the operations of the acceleration engine 1560. For example, the support systems 1574 can include a microprocessor that coordinates the activities of the acceleration engine 1560, including moving data around on the acceleration engine 1560. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 1572. In some examples, the program executed by the microprocessor is stored on the hardware of microprocessor, or on a non-volatile memory chip in the host system 1500. In some examples, the microprocessor and the acceleration engine 1560 can be on chip, such as one integrated circuit on the same die and in the same package.

In some examples, the support systems 1574 can be responsible for taking instructions from the host processor 1572 when programs executing on the host processor 1572 request the execution of a neural network. For example, the host processor 1572 can provide the support systems 1574 with a set of input data and a task that is to be performed on the set of input data. In this example, the support systems 1574 can identify a neural network that can perform the task, and can program the acceleration engine 1560 to execute the neural network on the set of input data. In some examples, the support systems 1574 only needs to select an appropriate neural network processing engine of the neural network processor. In some examples, the support systems 1574 may need to load the data for the neural network onto the acceleration engine 1560 before the acceleration engine 1560 can start executing the neural network. In these and other examples, the support systems 1574 can further receive the output of executing the neural network, and provide the output back to the host processor 1572.

In some examples, the operations of the support systems 1574 can be handled by the host processor 1572. In these examples, the support systems 1574 may not be needed and can be omitted from the host system 1500.

In various examples, the host system 1500 can include a combination of host systems, processor nodes, storage subsystems, and I/O chassis that represent user devices, service provider computers or third-party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 1500 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method for compiling a neural network model, the method comprising:
    obtaining a description of the neural network model by a compiler;
    generating, by compiling the description by the compiler, a data dependency graph of the neural network model;
    reordering, by the compiler, the data dependency graph to form an accumulation group (AG) pack of adjacent accumulation groups (AGs), wherein each AG includes one or more matrix multiplication instructions, and wherein the AG pack represents a consecutive sequence of matrix multiplication instructions;
    generating, by the compiler, a memory location base partition constraint graph (mlBPCG) of the AG pack according to a base partition constraint of tensors of the AG pack, the mlBPCG generated for memory locations of the tensors;
    generating, by the compiler, an AG row group constraint graph (agRGCG) based on the memory location base partition constraint graph and a starting row offset of tensors of the AGs, the agRGCG including row group constraints of the AGs for adjacency representation of the AGs;
    assigning, by the compiler, the AGs of the AG pack to tiles of a processing engine array based on the AG row group constraint graph; and
    generating, by the compiler, machine instructions for the neural network model based on the reordered data dependency graph and the assignment of the AGs to the tiles of the processing engine array.

2. The computer-implemented method of claim 1, wherein assigning the AGs of the AG pack to the tiles of the processing engine array includes assigning the AGs in descending order of tensor size.

3. The computer-implemented method of claim 1, further comprising assigning an unpacked AG based on tensor sharing between the unpacked AG and the AG pack.

4. The computer-implemented method of claim 1, wherein the processing engine array includes at least 4 row groups in a tile arrangement.

5. The computer-implemented method of claim 1, wherein generating the memory location base partition constraint graph of the AG pack includes: determining a first base partition constraint of tensors of a matrix multiplication instruction in an AG; and assigning the first base partition constraint to an edge between the tensors of the matrix multiplication instruction.

6. The computer-implemented method of claim 1, wherein generating the memory location base partition constraint graph of the AG pack includes: determining a transitive base partition constraint between tensors of different AGs; and assigning the transitive base partition constraint to an edge between the tensors of the different AGs.

7. The computer-implemented method of claim 1, wherein generating the AG row group constraint graph includes: determining a row constraint between the AGs of the AG pack based on edges of the memory location base partition constraint graph and the starting row offset between the tensors of the AGs; and assigning the row constraint to an edge between the AGs.

8. The computer-implemented method of claim 7, wherein assigning the AGs of the AG pack to the tiles of the processing engine array includes minimizing an objective function based on the row constraint in the AG row group constraint graph.

9. The computer-implemented method of claim 1, further comprising associating an AG pack identifier to the one or more matrix multiplication instructions of the AG pack.

10. The computer-implemented method of claim 1, further comprising inserting an assigned tile position to a matrix multiplication instruction of the AG pack.

11. A non-transitory computer-readable medium having stored therein instructions that, when executed by one or more processors, cause the one or more processors to execute a compiler, the compiler performing operations including:
    obtaining a description of a neural network model;
    generating, by compiling the descriptio,n a data dependency graph of the neural network model;
    reordering the data dependency graph to form an accumulation group (AG) pack of adjacent accumulation groups (AGs), wherein each AG includes one or more matrix multiplication instructions, and wherein the AG pack represents a consecutive sequence of matrix multiplication instructions;
    generating a memory location base partition constraint graph (mlBPCG) of the AG pack according to a base partition constraint of tensors of the AG pack, the mlBPCG generated for memory locations of the tensors;
    generating an AG row group constraint graph (agRGCG) based on the memory location base partition constraint graph and a starting row offset of tensors of the AGs, the agRGCG including row group constraints of the AGs for adjacency representation of the AGs;
    assigning the AGs of the AG pack to tiles of a processing engine array based on the AG row group constraint graph; and
    generating machine instructions for the neural network model based on the reordered data dependency graph and the assignment of the AGs to the tiles of the processing engine array.

12. The non-transitory computer-readable medium of claim 11, wherein the operations further include inserting an assigned tile position to a matrix multiplication instruction of the AG pack.

13. The non-transitory computer-readable medium of claim 12, wherein the operations further include scheduling the matrix multiplication instruction with the assigned tile position.

14. The non-transitory computer-readable medium of claim 11, wherein generating the memory location base partition constraint graph of the AG pack includes: determining a first base partition constraint of tensors of a matrix multiplication instruction in an AG; assigning the first base partition constraint to an edge between the tensors of the matrix multiplication instruction; determining a transitive base partition constraint between tensors of different AGs; and assigning the transitive base partition constraint to an edge between the tensors of the different AGs.

15. The non-transitory computer-readable medium of claim 11, wherein assigning the AGs of the AG pack to the tiles of the processing engine array includes minimizing an objective function based on the row group constraints in the AG row group constraint graph.

16. The non-transitory computer-readable medium of claim 11, wherein assigning the AGs of the AG pack to tiles of processing engine array includes assigning the AGs in descending order of tensor size.

17. The non-transitory computer-readable medium of claim 11, further comprising assigning an unpacked AG based on tensor sharing between the unpacked AG and the AG pack.

* * * * *